United States Patent
Sun et al.

(10) Patent No.: US 9,901,046 B2
(45) Date of Patent: Feb. 27, 2018

(54) ANTI-ALGAE SALINE AQUACULTURE SYSTEMS AND METHODS

(71) Applicant: Marine Agrifuture, LLC, Kahuku, HI (US)

(72) Inventors: Wenhao Harold Sun, Kaneohe, HI (US); Hongzhe Michael Sun, New York, NY (US)

(73) Assignee: Marine Agrifuture, LLC, Kakuku, HI (US)

( * ) Notice: Subject to any disclaimer, the term of this patent is extended or adjusted under 35 U.S.C. 154(b) by 0 days.

(21) Appl. No.: 15/605,215

(22) Filed: May 25, 2017

(65) Prior Publication Data
US 2017/0339853 A1    Nov. 30, 2017

Related U.S. Application Data

(60) Provisional application No. 62/341,209, filed on May 25, 2016.

(51) Int. Cl.
| | | |
|---|---|---|
| *G06F 19/00* | (2011.01) | |
| *A01G 33/00* | (2006.01) | |
| *A01G 7/00* | (2006.01) | |
| *A01K 61/00* | (2017.01) | |
| *A01G 31/00* | (2018.01) | |

(52) U.S. Cl.
CPC .............. *A01G 33/00* (2013.01); *A01G 7/00* (2013.01); *A01G 31/00* (2013.01); *A01G 2031/006* (2013.01); *A01K 61/00* (2013.01)

(58) Field of Classification Search
CPC .......... A01G 33/00; A01G 31/00; A01G 7/00; A01G 2031/006; A01K 61/00
See application file for complete search history.

(56) References Cited

U.S. PATENT DOCUMENTS

| 4,382,348 A * | 5/1983 | Kitsu ..................... A01G 31/02 47/39 |
| 2004/0255513 A1* | 12/2004 | Becker ..................... A01G 9/00 47/65.9 |

(Continued)

FOREIGN PATENT DOCUMENTS

| CN | 101491207 A | 7/2009 |
| CN | 101151961 B | 6/2010 |

(Continued)

OTHER PUBLICATIONS

Sinai, G., W. A. Jury, and L. H. Stolzy. "Application of automated flow and salinity control to dilution of saline irrigation water." Irrigation Science 6.3 (1985): 179-190.*

(Continued)

*Primary Examiner* — Michael D Masinick
(74) *Attorney, Agent, or Firm* — Aurora Consulting LLC; Ashley Sloat

(57) ABSTRACT

A method of irrigating a saline aquaculture system to control pests is described herein. The method includes acquiring a second set of environmental condition data on a computing device using a sensor coupled to a platform, such that the platform is configured to grow a salt-tolerant plant therein; comparing the second set of environmental condition data to a first set of environmental condition data acquired at a previous time point; determining whether freshwater accumulation has increased or will increase at a future time point on a surface of the platform; when it is determined that the freshwater accumulation on the surface of the platform has increased or will increase relative to the previous time point, activating a saltwater distribution device coupled to the platform; and reducing an accumulation of one or more of: insects, caterpillars, fungi, and bacteria on the surface of the platform.

20 Claims, 16 Drawing Sheets

(56) References Cited

U.S. PATENT DOCUMENTS

| | | | | |
|---|---|---|---|---|
| 2005/0044788 | A1* | 3/2005 | Tang | A01G 9/00 47/59 S |
| 2005/0048080 | A1* | 3/2005 | Katzen | A61K 36/02 424/195.17 |
| 2016/0219811 | A1* | 8/2016 | Kati | A01G 33/00 |
| 2017/0127656 | A1* | 5/2017 | Bee | A01K 63/006 |
| 2017/0238485 | A1* | 8/2017 | Zhang | A01G 31/02 |

FOREIGN PATENT DOCUMENTS

| | | |
|---|---|---|
| CN | 101462799 B | 2/2011 |
| CN | 102668967 A | 9/2012 |
| JP | 2007532109 A | 11/2007 |
| WO | 2005102030 A2 | 11/2005 |

OTHER PUBLICATIONS

Parida, Asish Kumar, and Anath Bandhu Das. "Salt tolerance and salinity effects on plants: a review." Ecotoxicology and environmental safety 60.3 (2005): 324-349.*

Commercial Aquafarm™—Food Security Technology, accessed Apr. 29, 2016 <http://www.foodsecuritytech.com/commercial-aquafarmtrade.html>.

Handcultivated Farm Visits, Food Warriors 2012, Hawaii, Interviews, Real Time Farms, Hawaiian Fish Pond 2.0, accessed Apr. 29, 2016 <https://handcultivated.wordpress.com/2012/03/08/hawaiian-fish-pond-2-0/>.

Hawaiian Grown TV, "Kahuku Sea Asparagus—Marine AgriFuture—Segment 1," YouTube accessed Apr. 29, 2016 <https://www.youtube.com/watch?v=s5xG8F4_iFo>.

Shima, S., Hawaii News Now, "Healthy sea asparagus thrives on Oahu's North Shore," accessed Apr. 29, 2016 <http://www.hawaiinewsnow.com/story/9231899/healthy-sea-asparagus-thrives-on-oahus-north-shore>.

Lurie J., Food GPS, "Marine AgriFuture: Harvesting Sea Vegetables on North Shore," accessed Apr. 29, 2016 <https://foodgps.com/marine-agrifuture-sea-aparagus-oahu-north-shore/>.

Olakai Hawaii vitality from the sea, "Sea Asparagus," accessed Apr. 29, 2016.

Honolulu Star Bulletin, vol. 11, Issue 207, Wednesday, Jul. 26, 2006, "Sea Greens," accessed Apr. 29, 2016 <http://archives.starbulletin.com/2006/07/26/features/story01.html>.

The Yield, accessed May 2, 2016 <http://www.theyield.com/>.

* cited by examiner

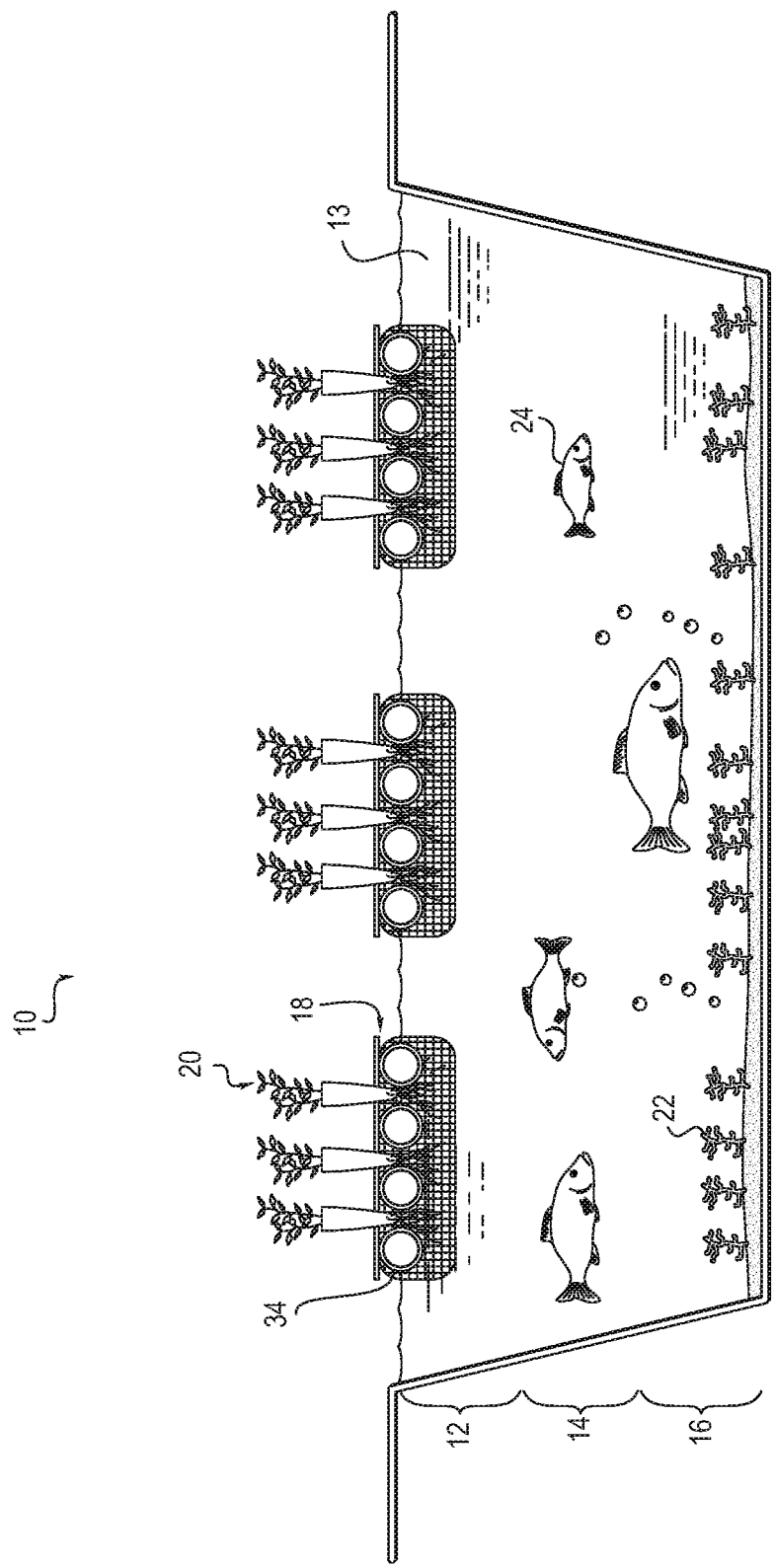

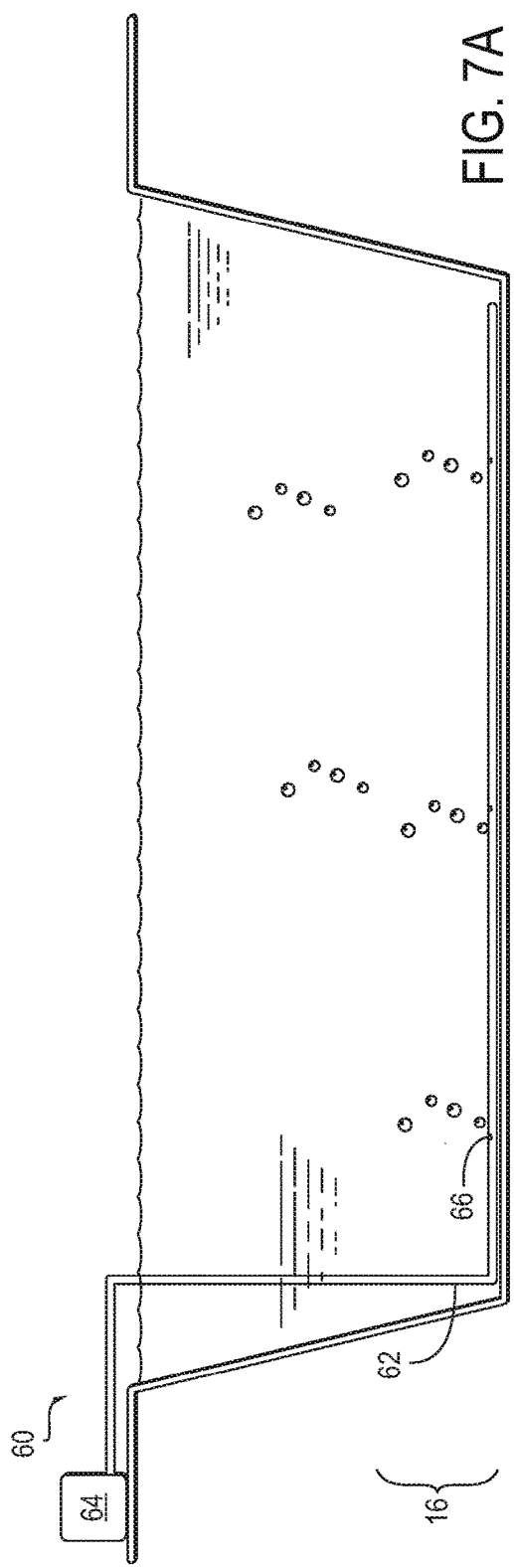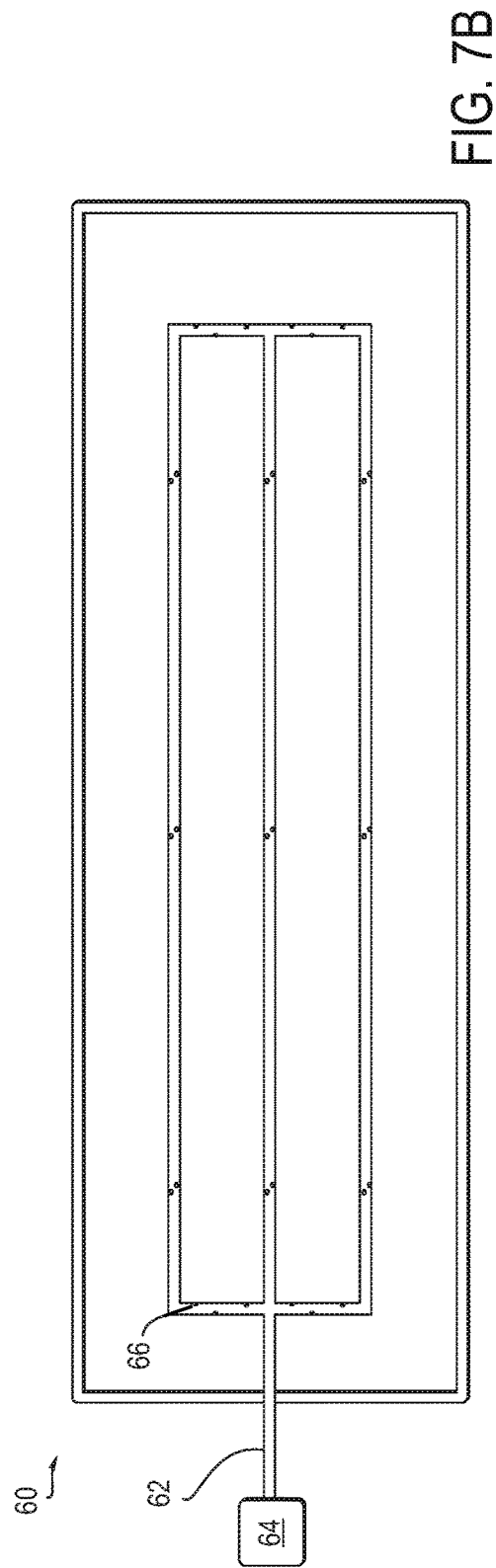

ANTI-ALGAE SALINE AQUACULTURE SYSTEMS AND METHODS

CROSS-REFERENCE TO RELATED APPLICATIONS

This application claims the benefit of U.S. Provisional Patent Application Ser. No. 62/341,209, entitled "Multi-level Saline Aquaculture Pond Systems and Methods of Using Same," filed May 25, 2016, the disclosure of which is herein incorporated by reference in its entirety.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of plant agriculture, and more specifically to the field of marine agriculture. Described herein are anti-algae saline aquaculture pond systems and methods of using same.

BACKGROUND

A continuing challenge in food production is finding enough water and arable land to feed the world's population. Shortages of arable land and fresh water are among the most urgent global problems. Arable land is limited and its availability is shrinking. Forty-three percent of the earth's total land is arid or semiarid. Further, it has been estimated that 25 million hectares of agricultural land are lost every year as a result of increased soil salinity. As the world population continues to grow, steadily devouring existing farmland and water supplies previously used for crops, the demand increases for food and fresh water for human consumption.

In preparation for the future demand for additional sources of arable land, researchers have attempted to determine whether crops can be grown by irrigation of soils with seawater. One attempt involves the development of land-based seawater farming of salt-tolerant plants (such as *Salicornia*) by irrigation with seawater. The challenge, however, is that the majority of terrestrial plants are intolerant to high levels of salinity. The accumulation of salt in the soil when it is irrigated with seawater eventually kills even salt-tolerant plants because salt accumulation in soil eventually exceeds their tolerance limit.

There have been some advances in methods and systems for growing salt-tolerant terrestrial plants in ocean water, but these current systems and methods are limited. For example, these systems and methods have only been designed to maintain a narrow range of conditions suitable for growing a few salt-tolerant plants. While there have been some advances in methods and systems for growing other plants such as seaweed plants integrated with cultivation of fish in ocean water or marine environment, these systems continue to have shortcomings, for example and fast growth of algae and fungus within the system limits production and quality of the seaweed plants yielded from the system. Commercially produced seaweed is grown in tanks in which vast amounts of nutrients are pumped into the system and the water is continuously filtered to remove waste produced by, for example fish in the system, algae or other growth in the system, or accumulation of debris and waste from the growing seaweed. Additionally, commercial production of seaweed in air turbulent tanks requires carbon dioxide supplementation in the system.

Further, global climate change is putting an ever increasing demand on agriculturists, farmers, horticulturists, etc. to respond rapidly to changing weather and climate conditions. For example, in the case of a large agronomic or hydroponic farm, an agriculturist, horticulturist, farmer, etc. needs to be able to rapidly apply irrigation, chemicals, fertilizer, etc. to all the crops under their care. Accomplishing this manually or even determining manually whether irrigation, chemicals, fertilizer, etc. should be applied is a herculean task that would requires numerous employees and a general knowledge of weather indicators and patterns, which is difficult for any one person to effectively master.

Lastly, the control of insects, fungi, and bacteria on cultivated plants has proven difficult without using chemicals or genetically modified organisms. Compounding this issue is that many pesticides have restricted use in water or marine environments and there is an ever-growing demand for organic food sources.

Thus, growing seaweed can be an expensive and time-consuming undertaking, and growing other salt-tolerant edible plants can be challenging, at best. Additionally, it is difficult to effectively and rapidly respond to changing weather and climate conditions and to know when conditions will change and to what end. Lastly, it is difficult to control algae and other pests in marine environments without the use of pesticides or genetic engineering. Accordingly, there is a need for new and useful saline aquaculture systems and related methods of use.

SUMMARY

There is a need for increased crop production in non-traditional agricultural settings. In particular, there is a need for a method of controlling insects and diseases to increase crop production in saline-rich or marine environments. There is a need for systems and methods that can rapidly and effectively respond to changing climate and weather conditions. There is a need for improved aquaculture systems and methods that efficiently utilize the space and resources of an aquaculture system. There is a need for systems and methods of biologically controlling microscopic algae for sustainably growing a variety of seaweed plants and/or marine animals (e.g., fish and or shellfish) in saline water. There is a need for a method of maximizing the availability of nutrients in the sediments for better productivity of all plants and animals in the integrated multi-trophic aquaculture systems. Various embodiments of the present disclosure address one or more of these needs.

One aspect of the present disclosure is directed to a multi-level saline aquaculture pond system. In some embodiments, the system includes an upper platform level, a middle level, and a lower level. The upper platform level may include a platform comprising a plant-receiving receptacle for growing a first salt-tolerant plant therein, which provides an inhibitory effect on the growth of microscopic algae and clarifies the saltwater in the pond The middle level may include a water-dwelling animal for providing nutrients to the first salt-tolerant plant and a second salt-tolerant plant. The lower level may include the second salt-tolerant plant for providing food and oxygen for the animals and/or the first salt-tolerant plant, and an aeration device for agitation in the lower level to induce nutrient distribution and providing additional oxygen in the system.

In some embodiments, the aeration device includes a conduit having one or more apertures. In some embodiments, oxygen is delivered into the system through the one or more apertures. In some embodiments, the aeration device includes a mechanical agitator In some embodiments, the platform includes a membrane supported by two or more buoyant elongate members.

In some embodiments, the first salt-tolerant plant is from the *Salicornia* spp.

In some embodiments, the second salt-tolerant plant is from *Gracilaria* spp.

Another aspect of the present disclosure is directed to a multi-level saline aquaculture pond system. In some embodiments, the system includes an upper level, a middle level, and a lower level. The upper level may include a platform including a top surface having a plant-receiving receptacle for growing a first salt-tolerant plant and a root system of the first salt-tolerant plant surrounded by a net secured to the top surface. There are one or more sensors disposed on a portion of the platform. In some embodiments, the one or more sensors are configured for measuring an environmental condition around the platform.

In some embodiments, the one or more sensors include one or more of: a nitrogen sensor, a pH sensor, a salinity sensor, an oxygen sensor, a carbon dioxide sensor, a turbidity sensor, a temperature sensor, a trace metal analyzer, a nutrient analyzer, a relative humidity sensor, a Dew point sensor, a barometer, an orientation sensor, and a camera (e.g., for detecting one or more pests).

In some embodiments, the environmental condition includes a temperature, a moisture level, a salinity level, a nitrogen level, a pH level, an oxygen level, a carbon dioxide level, a trace metal level, a nutrient level, a weather forecast, precipitation, bacterial growth, fungal growth, an algae growth, and an insect presence.

In some embodiments, the system further includes a computing device communicatively coupled to the one or more sensors. In some embodiments, the computing device is one of: a laptop, a desktop computer, a netbook, a notebook, and a cellular device. In some embodiments, the computing device is configured to display one or more environmental conditions measured by the one or more sensors.

In some embodiments, the system further includes a server. In some embodiments, the server is one of: a remote server, virtual server, and local server.

In some embodiments, the net provides a barrier between a root system of the first salt-tolerant plant and the water-dwelling animal.

Another aspect of the present disclosure is directed to a multi-level saline aquaculture system. In some embodiments, the system includes an upper level, middle level, and a lower level. The upper level may include a platform including a top surface having a plant-receiving receptacle for growing a first salt-tolerant plant therein and a top surface having a net secured thereto, the first salt-tolerant plant, and a saltwater distribution device configured to provide saltwater to the first salt-tolerant plant growing in the plant-receiving receptacle on the platform. The middle level may include a water-dwelling animal; and the lower level may include a second salt-tolerant plant.

In some embodiments, the system further includes one or more sensors disposed on a portion of the platform. In some embodiments, the one or more sensors are configured for measuring an environmental condition around the platform.

In some embodiments, the one or more sensors include one or more of: a nitrogen sensor, a pH sensor, a salinity sensor, an oxygen sensor, a carbon dioxide sensor, a turbidity sensor, a temperature sensor, a trace metal analyzer, a nutrient analyzer, a relative humidity sensor, a Dew point sensor, a barometer, an orientation sensor, and a camera.

In some embodiments, the environmental condition includes a temperature, a moisture level, a salinity level, a nitrogen level, a pH level, an oxygen level, a carbon dioxide level, a trace metal level, a nutrient level, a weather forecast, precipitation, a wave swell, bacterial growth, fungal growth, algae growth, and insect (e.g., caterpillar) detection. In some embodiments, the weather forecast is one or more of a monsoon, storm, wind, rain, and sun.

In some embodiments, the saltwater distribution device is activated in response to a signal from the one or more sensors. In some embodiments, the saltwater distribution device is activated in response to detection of precipitation.

In some embodiments, the system further includes a waste removal device.

Another aspect of the present disclosure is directed to a method of irrigating a multi-level saline aquaculture pond system. In some embodiments, the method includes detecting an environmental condition using one or more sensors coupled to a platform, such that the platform includes a plant-receiving receptacle for growing a salt-tolerant plant therein; and if the environmental condition is indicative of increased fresh water moisture, activating a saltwater distribution device, such that the saltwater distribution device is configured to provide saltwater to the salt-tolerant plant growing in the plant-receiving receptacle on the platform.

In some embodiments, the method further includes transmitting the environmental condition data to a computing device communicatively coupled to the system.

In some embodiments, the method further includes receiving a user input that determines a status of the saltwater distribution device. In some embodiments, the status is one of off, light saltwater distribution, and heavy saltwater distribution.

In some embodiments, the method further includes analyzing the environmental condition data to determine a probability that the system will experience an increase in fresh water moisture.

In some embodiments, the method further includes displaying the environmental condition data on a display of a computing device communicatively coupled to the system.

Another aspect of the present disclosure includes a computer-implemented method of irrigating a saline aquaculture system. The computer-implemented method includes: acquiring a second set of environmental condition data on a computing device using a sensor coupled to a platform, such that the platform defines an aperture configured to receive a plant-receiving receptacle therein, and the second set of environmental condition data comprises one or more of: sunlight data, humidity data, precipitation data, and water salinity content data; comparing, using the computing device, the second set of environmental condition data to a first set of environmental condition data acquired at a previous time point; determining whether freshwater accumulation has increased or will increase at a future time point on a surface of the platform; and when it is determined that the freshwater accumulation on the surface of the platform has increased or will increase relative to the previous time point, activating a saltwater distribution device, such that the saltwater distribution device is configured to provide saltwater to a salt-tolerant plant growing in the plant-receiving receptacle on the surface of the platform.

In some embodiments, the method further includes reducing an accumulation of one or more of: insects, caterpillars, fungi, and bacteria on the surface of the buoyant platform.

In some embodiments, the second set of environmental condition data includes pest data indicating a presence of one or more of: insects, caterpillars, fungi, and bacteria on the surface of the platform. For example, the pest data may be acquired by a camera disposed on the platform.

In some embodiments, the method further includes transmitting the environmental condition data to a computing device communicatively coupled to the system.

In some embodiments, activating the saltwater distribution device includes receiving a user input to activate the saltwater distribution device.

In some embodiments, activating the saltwater distribution device includes automatically activating the saltwater distribution device.

In some embodiments, the method further includes comparing weather forecast data with the second set of environmental condition data; and calculating a probability that the platform will experience an increase in fresh water accumulation.

In some embodiments, comparing includes comparing a first set of precipitation data measured in the first set of environmental condition data to a second set of precipitation data measured in the second set of environmental condition data.

In some embodiments, the method further includes analyzing the sunlight data, precipitation data, and water salinity data in the second set of environmental condition data together to determine an amount and salt content of water on the surface of the platform.

In some embodiments, the method further includes analyzing the humidity data and sunlight data from the second set of environmental condition data together to determine if there is an increased probability of rain at the future time point.

In some embodiments, acquiring includes measuring an amount of precipitation on or around the platform.

Another aspect of the present disclosure includes a saline aquaculture system. The system includes a platform defining an aperture configured to receive a plant-receiving receptacle for growing a salt-tolerant plant therein; a sensor coupled to the platform; and a computing device communicatively coupled to the platform and including a processor, and a computer readable medium having non-transitory, processor-executable instructions stored thereon, such that execution of the instructions causes the processor to perform a method. In some embodiments, the method includes acquiring a second set of environmental condition data using the sensor coupled to the platform, such that the second set of environmental condition data comprises one or more of: sunlight data, humidity data, precipitation data, and water salinity content data; comparing, using the computing device, the second set of environmental condition data to a first set of environmental condition data acquired at a previous time point; determining whether freshwater accumulation has increased or will increase at a future time point on a surface of the platform; and when it is determined that the freshwater accumulation on the surface of the platform has increased or will increase relative to the previous time point, activating a saltwater distribution device, such that the saltwater distribution device is configured to provide saltwater to the salt-tolerant plant growing in the plant-receiving receptacle on the surface of the platform.

In some embodiments, the platform includes a membrane supported by two or more buoyant elongate members.

In some embodiments, the system further includes a penetrable barrier coupled to the platform.

In some embodiments, the salt-tolerant plant is a *Salicornia* spp.

In some embodiments, the one or more sensors include one or more of: a salinity sensor, a temperature sensor, a relative humidity sensor, a Dew point sensor, a barometer, a photometer, a rain gauge, and a camera.

In some embodiments, the environmental condition includes one or more of: a temperature, a moisture level, a salinity content, a humidity level, an amount of precipitation, a sunlight intensity, bacterial growth, fungal growth, algae growth, and insect presence.

In some embodiments, the system further includes an antenna coupled to the platform, the antenna being configured to transmit the environmental condition data to the computing device.

In some embodiments, the computing device is configured to display the first and second sets of environmental condition data.

In some embodiments, the system further includes a water-dwelling animal and a second salt-tolerant plant, such that the water-dwelling animal and the second salt-tolerant plant reside in a liquid surrounding the platform.

In some embodiments, the system further includes an aeration device configured to provide oxygen and agitation in the liquid to induce nutrient distribution in the liquid.

BRIEF DESCRIPTION OF THE DRAWINGS

FIG. 1A illustrates a side view of one embodiment of a multi-level saline aquaculture system.

FIG. 7A illustrates a side view of one embodiment of an aeration device.

FIG. 7B illustrates a top view of one embodiment of an aeration device.

DETAILED DESCRIPTION

Figure 1B:
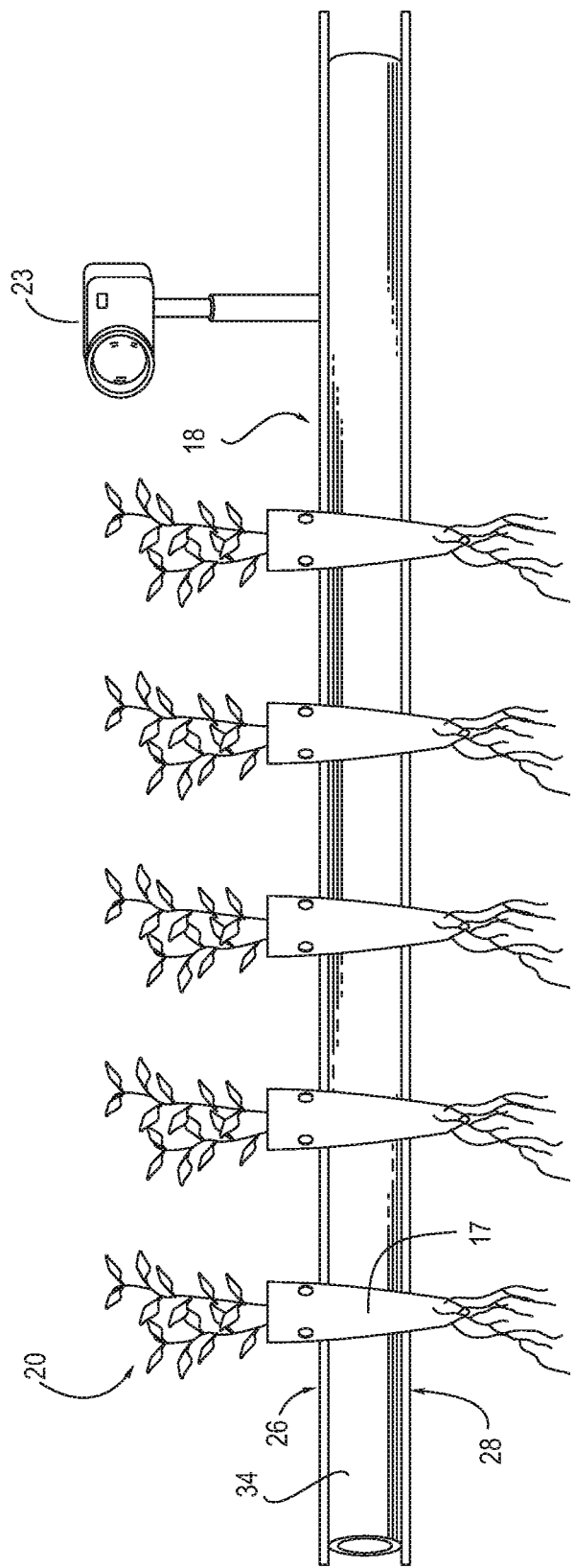
FIG. 1B illustrates a side view of one embodiment of a double layer platform equipped with a camera in a multi-level saline aquaculture system.

The foregoing is a summary, and thus, necessarily limited in detail. The above mentioned aspects, as well as other aspects, features, and advantages of the present technology will now be described in connection with various embodiments. The inclusion of the following embodiments is not intended to limit the invention to these embodiments, but rather to enable any person skilled in the art to make and use this invention. Other embodiments may be utilized and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

As used in the description and claims, the singular form "a", "an" and "the" include both singular and plural references unless the context clearly dictates otherwise. For example, the term "platform" may include, and is contemplated to include, a plurality of platforms. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, element, or feature.

As used herein, the term "comprising" or "comprises" is intended to mean that the systems and methods include the recited elements, and may additionally include any other elements. "Consisting essentially of" shall mean that the systems and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed invention. "Consisting of" shall mean that the systems and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the described embodiments, and other embodiments not specifically described herein, will be apparent to those of skill in the art upon reviewing this description.

Disclosed herein are multi-level aquaculture pond systems and methods for using and/or configuring such systems. A user of the systems and/or methods described herein includes a farmer, horticulturalist, aquaculture specialist, botanist, gardener, system manager, agricultural manager, harvester, data collection scientist, hydrologist, engineer, food science technician, plant biochemist, plant biologist, conservationist, pathologist, landscape scientist or architect, environmental scientist, plant breeder or geneticist, propagation scientist, soil scientist, agronomist, field adviser, or any other individual suitable for maintaining, managing, or otherwise configuring the system.

As described herein, the system may be configured for a man-made pond, for example adjacent to a brackish water source, or a natural pond that is excavated and/or otherwise adapted. In some embodiments, the system may be adapted for use in open water, for example in the ocean, the Dead Sea, or other natural bodies of water. In some such embodiments, the system may include a net to exclude predatory animals from entering the system and/or to prevent water-dwelling animals in the system from escaping. In some embodiments, the system is adapted for a tank or pool, for example for propagating fish or shrimp. The tank or pool may include one or more waste removal systems to remove excess waste produced by a plurality of water-dwelling animals in the tank or pool. In some such embodiments, one or more system components may not be needed or additional system components may be required, as will be described in more detail elsewhere herein.

As used herein, a "salt-tolerant plant" refers to any genus or species of plant that can grow in a hypersaline environment or environment of moderate salinity, for example saline water. Non-limiting examples of such plants include: *Salicornia* spp. (e.g., *Salicornia virginica, Salicornia europaea, Salicornia bigelovii, Sarcocornia perennis, Salicornia ramosissima, Salicornia maritime, Salicornia brachiate*, etc.), *Sesuvium portulacastrum* (i.e., akulikuli), *Portulaca portulacastrum, Trianthema portulacastrum* var. *hillebrandii, Tetragonia tetragonioides* (i.e., sea spinach), *Suaeda glance* (Bunge) Bunge, *Beta vulgaris* subsp. *Maritima* (i.e., sea beet), *Gracilaria* spp. plant, (e.g., Kahuku Ogo (*Gracilaria tikvahiae*), Robusta Ogo (*Gracilaria salicornia*), Red Ogo (*Gracilaria parvisora*), or any other salt-tolerant plant.

As used herein, a "sea asparagus plant" refers to any developmental stage of sea asparagus, for example crown, stem, spear, fern, seed, seedling, sprout, vegetative stage, full-grown, mature, or any other developmental stage known to one of skill in the relevant art. A sea asparagus plant may include any *Salicornia* spp. plant, for example, *Salicornia virginica, Salicornia europaea, Salicornia bigelovii, Sarcocornia perennis, Salicornia ramosissima, Salicornia maritime, Salicornia brachiate*, or any other *Salicornia* spp. known to one of skill in the relevant art.

As used herein, a "seaweed plant" refers to any developmental stage of seaweed, for example spore, cystocarp, carpospore, disc form, tetrasporophyte, tetrasporagium, tetraspore, gametophyte, spermatangium, carpogonium, mature, full-grown, or any other developmental stage known to know of skill in the relevant art. A seaweed plant may include any *Gracilaria* spp. plant, for example Kahuku Ogo (*Gracilaria tikvahiae*), Robusta Ogo (*Gracilaria salicornia*), Red Ogo (*Gracilaria parvispora*), or any other *Gracilaria* spp. known to one of skill in the relevant art.

As used herein, a "water-dwelling animal" refers to any species of marine or saltwater fish, crustacean, or other animals that reside in the saltwater, tolerate varying degrees of salinity, and are used to provide nutrients and fertilizer to the plants in the system. Examples of water-dwelling animals include: Barramundi, Seabass, Seabream, Moi, Cod, Cichlids (e.g., Tilapia), Oysters, Clams, Mussels, Abalone, Shrimp, or any other type or species of fish, crustacean, or saltwater-dwelling animals known to one of skill in the relevant art.

As used herein, "buoyant" refers to the quality of being capable of floating. A "buoyant platform" is capable of fully or partially floating at the surface of a body of water in which it is placed. For example, a buoyant platform includes: a buoyant system, buoyant cultivation system, buoyant support structure, buoyant ties and ropes, and also buoyant sheets or layers. The plants or other features of the system may provide or contribute to the buoyancy necessary to keep the platform buoyant.

As used herein, "liquid" refers to any aqueous substance capable of supporting plant growth. For example, a liquid as used herein includes: freshwater, saltwater, brackish water, or any other aqueous substance capable of supporting plant growth.

As used herein, "clean water" refers to water free from contaminants or substantially free of or reduced in contaminants such as bacteria, algae, fungus, microbes, pesticides, toxins, suspension particles, and/or any other substance that may be detrimental to the growth of the plants in the system.

As used herein, "pest" refers to any insect, caterpillar, fungi, bacteria, algae, or other organism that reduces the health, vitality, quality, or otherwise harvestability of a crop or plant.

Systems

As shown in FIG. 1A, a saline aquaculture system 10 includes: an upper level 12; an optional middle level 14; and an optional lower level 16. The system 10 functions to provide an ecosystem in which one or more plant species and water-dwelling animals thrive together based on a cycle of supply and demand to provide one or more harvestable food sources. For example, the system 10 may include a first salt-tolerant plant, a second salt-tolerant plant, and a water-dwelling animal. The system may be used for aquaculture, but can additionally or alternatively be used for any suitable applications, agricultural or otherwise. The system can be configured and/or adapted to function for any suitable cultivation or horticulture purpose.

As shown in FIG. 1A, the upper level 12 is positioned closest to a surface of a liquid 13 and may include a first salt-tolerant plant 20 (e.g., sea asparagus) and a platform 18. The platform 18 may be a buoyant platform; a platform positioned at a water surface using one or more support beams, struts, stilts, legs, or other supports coupled to the platform; or a platform suspended over a water surface using a balloon, drone, or other hovering or floating device. In some embodiments, the one or more supports are adjustable in length or height and are couplable to a floor or bottom of the system or to a dock or sidewall of the system. The first salt-tolerant plant 20 functions to suppress the growth of microscopic algae and maintain clean water in the system 10 and supply carbon dioxide in the system 10 for an optional second salt-tolerant plant (e.g., seaweed) 22.

The middle level 14 may be positioned below the upper level 12 and may include a liquid 13, for example saltwater, and optionally, a water-dwelling animal 24 in the liquid 13. The water-dwelling animal 24 functions to provide nutrients to the first salt-tolerant plant 20 and the second salt-tolerant plant 22.

The lower level 16 may be positioned at ground level, on a sea floor, on a bottom of the system 10, or at a depth below the upper level 12 (and below the middle level 14, if present). The lower level 16 may include a second salt-tolerant plant 22 for providing oxygen for the first salt-tolerant plant 20 and the water-dwelling animal 24. In some embodiments, the second salt-tolerant plant 22 is additionally or alternatively positioned on or in the platform 18 or in a middle level of the system 10.

Figure 3:
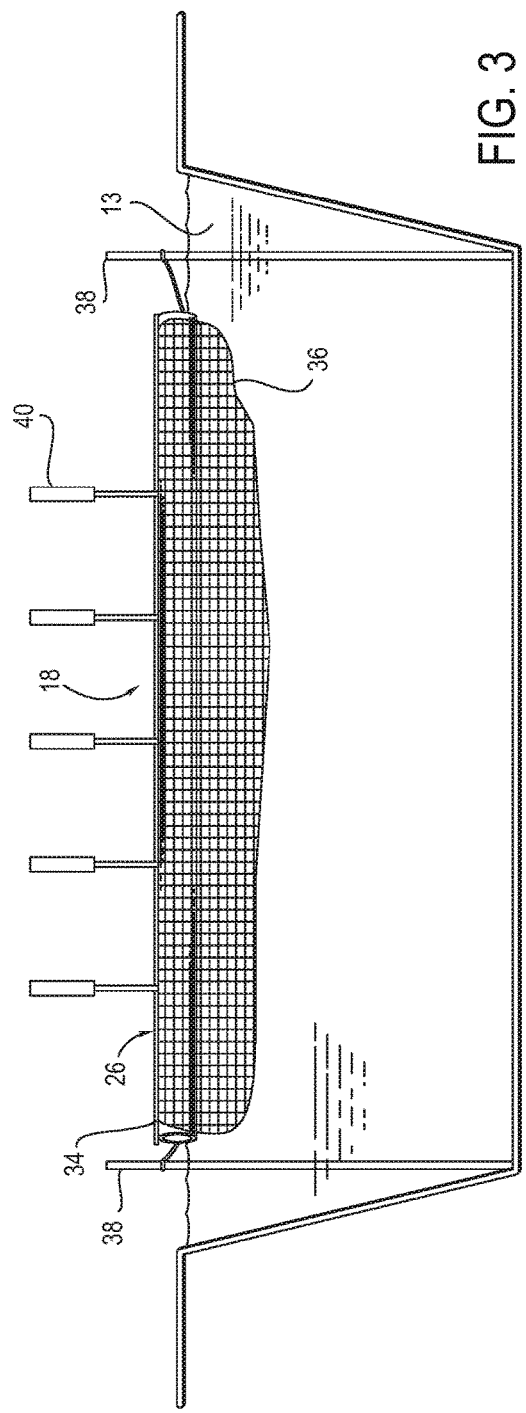
FIG. 3 illustrates a side view of one embodiment of a platform equipped with a device for saltwater irrigation within a multi-level aquaculture system.

In some embodiments, the system 10 is configured for a tank or pool. In some such embodiments, the system 10 includes a platform 18 and, optionally, a salt-tolerant plant 20 positioned in or on top of the platform 18. In some embodiments, the system 10 is configured for an open water environment. In some embodiments, the system 10 includes a platform 18, optionally a first salt-tolerant plant 20 positioned in or on top of the platform 18, optionally a second salt-tolerant plant 22 positioned in or on top of the platform 18 or in or on a middle level 14 or lower level 12 of the system, and optionally a water-dwelling animal 24 in a middle level 14 of the system. In some embodiments, for example, in some open water environments, the water-dwelling animal 24 is maintained in the system 10 by a barrier 36, for example mesh, netting, or other porous material, as shown in FIG. 3.

Figure 5A:
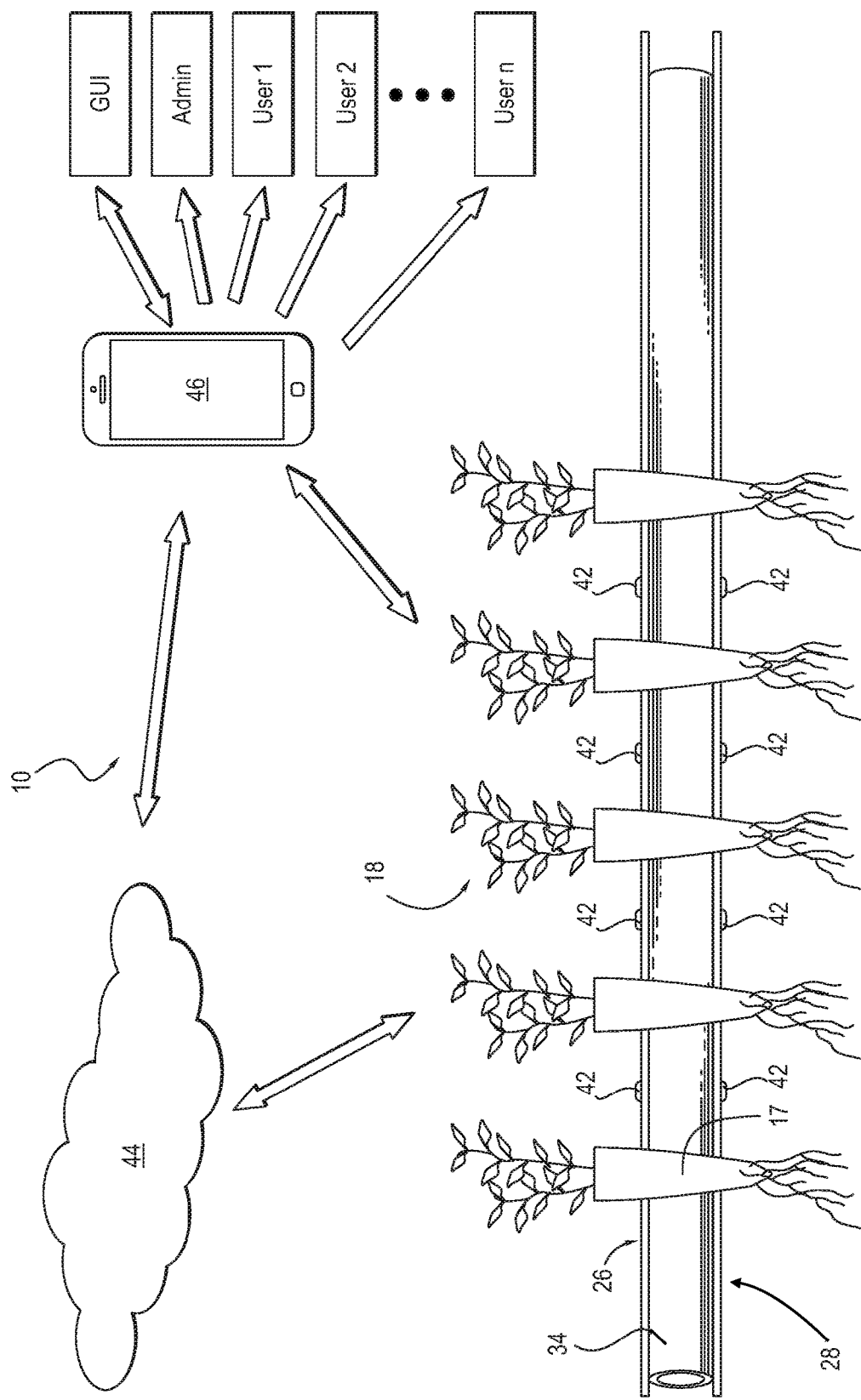
FIG. 5A illustrates schematically one embodiment of a system for monitoring and/or controlling an environmental condition surrounding a platform or a feature of the system.

Turning to FIGS. 1B-3, the upper level 12 may include a platform 18. The platform 18 includes a top surface 26 and, optionally a bottom surface 28 as shown in FIG. 1B and FIG. 5A. The top surface 26 receives and/or supports one or more salt-tolerant plants. The bottom surface 28, when present, rests on or is suspended on or in the liquid 13 and may function to provide additional weight and stability to the platform in occasions of wind, waves, or other events. The top surface 26 may include a simple sheet or layer suspended at the surface of the liquid 13. The sheet or layer functions to physically support plant growth on the platform 18. The sheet or layer may be porous or impermeable. The sheet may be of a single layer or multiple layers. In some embodiments, the sheet may be folded to form any desired shape (e.g., rectangular, circular, hexagonal, triangular, etc.). The sheet or layer may be prepared from any suitable material including but not limited to: a woven or non-woven material, a mesh, netting, shade cloth, plastic, a textile, ground cover, screen, metal screen, nylon screen, polypropylene shade cloth, polycarbonate, polyvinylbutyrate, polyamide, polyvinyl chloride, ethylenevinylacetate copolymer polyurethane, polystyrene, polyvinylidine, polypropylene, polyamides, polyacrylates, polycarbonates, bubble wrap, buoyant package filler material, composites, polysulfone, fiberglass, polyvinylidine difluoride, metallic materials, closed cell polymer foam, HDPE (high density polyethylene), reclaimed materials, recyclable materials, and various other materials known to one of skill in the relevant art.

Figure 1C:
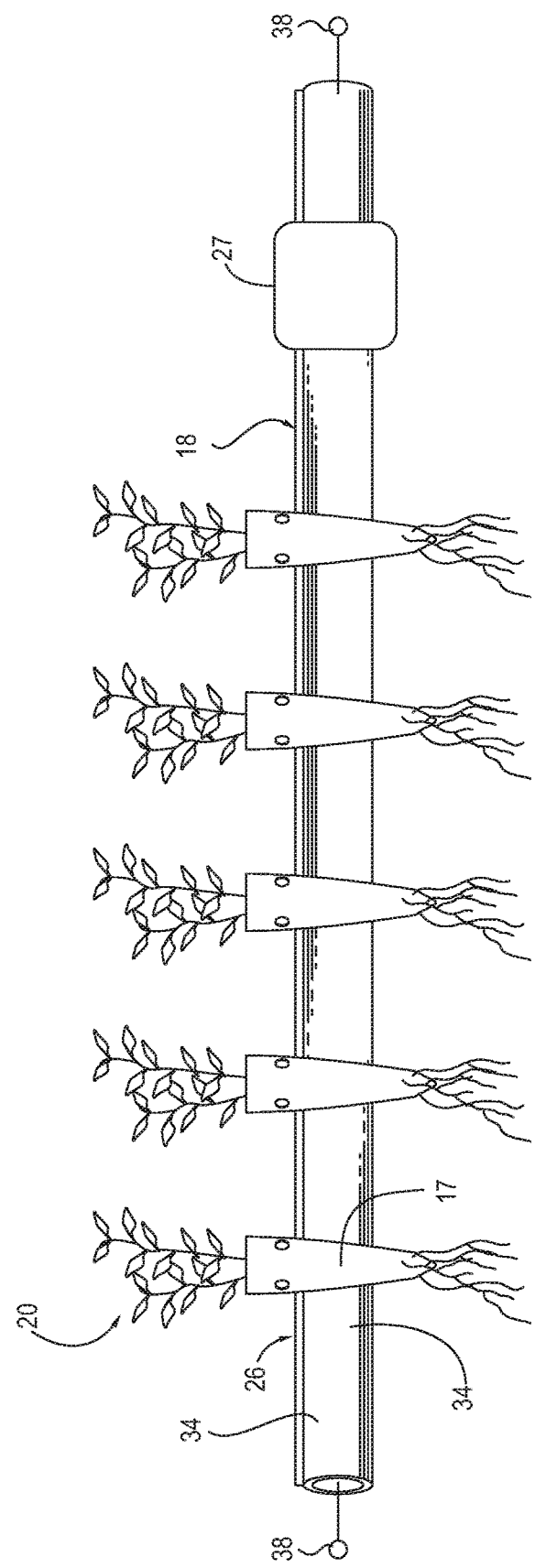
FIG. 1C illustrates a side view of one embodiment of a multi-level saline aquaculture system equipped with an identifying tag.
Figure 2:
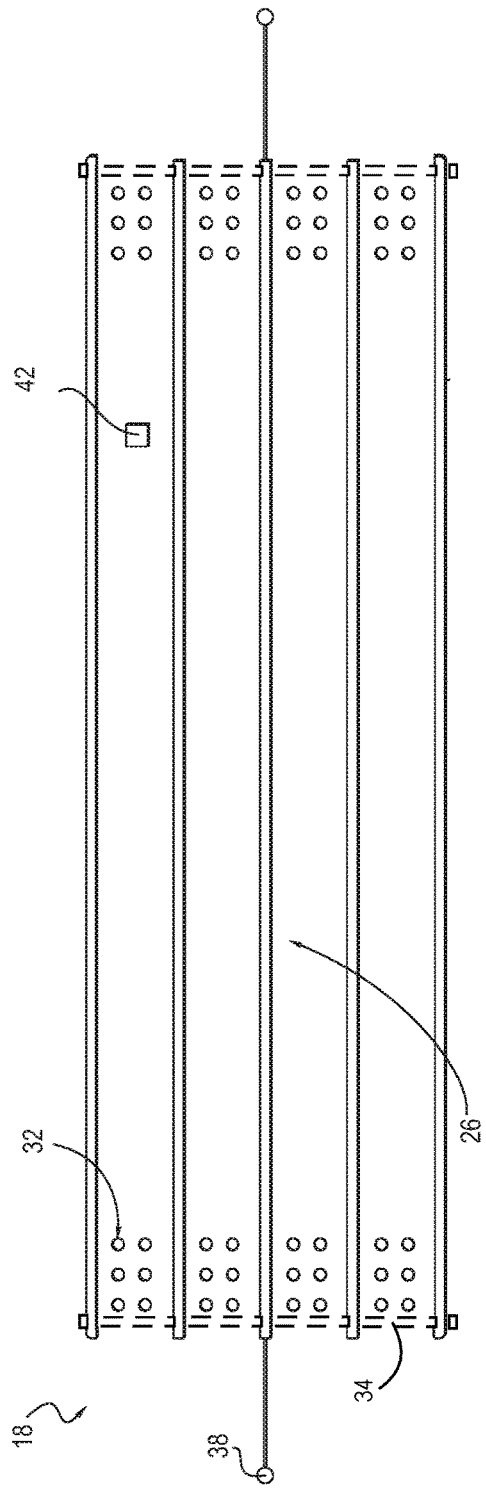
FIG. 2 illustrates a top view of one embodiment of a configuration of elongate members in a platform.
Figure 4:
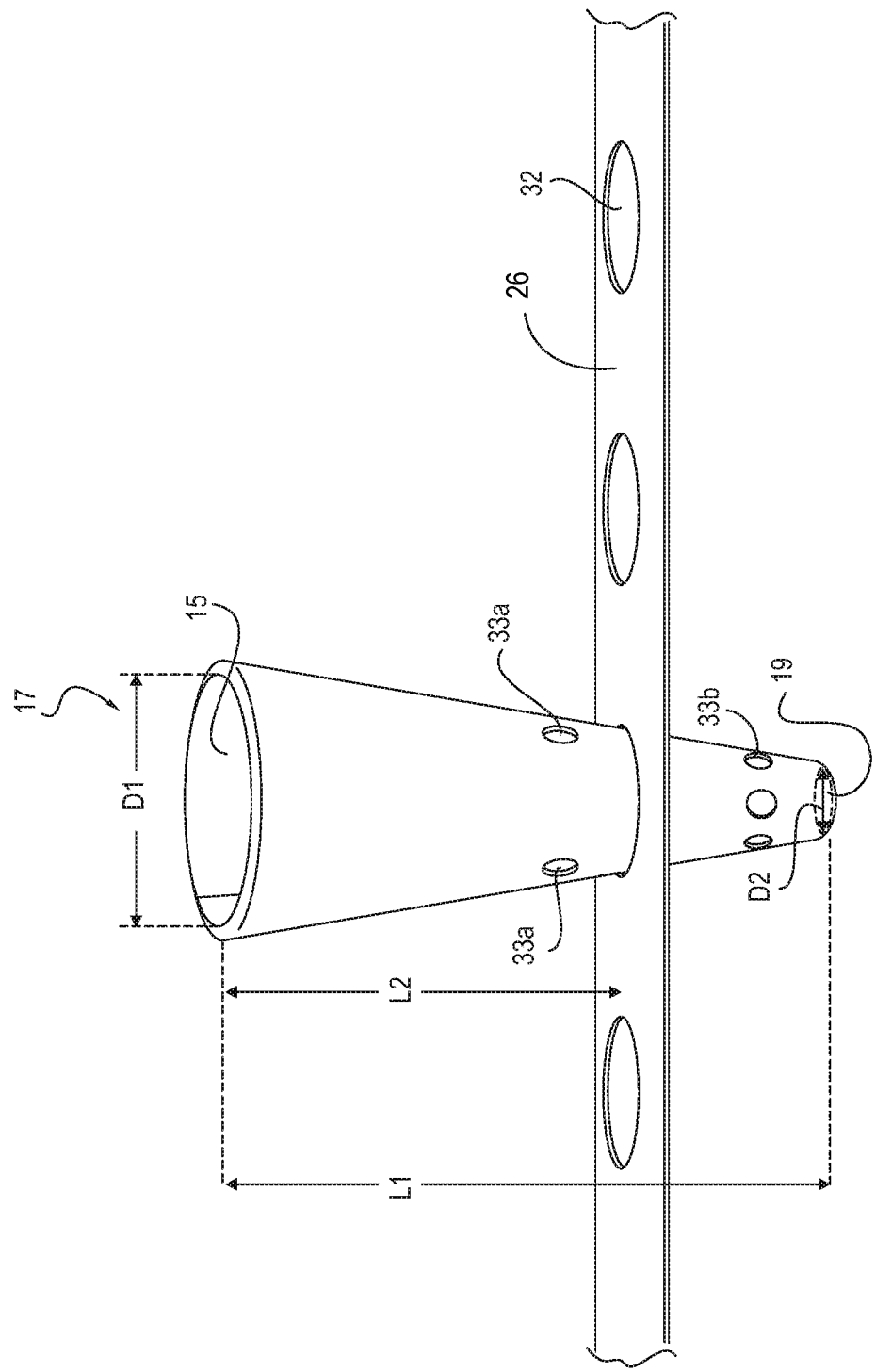
FIG. 4 illustrates a perspective view of one embodiment of a plant-receiving receptacle.

As visible, for example, in the top view of FIG. 2, the top surface 26 of the platform 18 may include an aperture 32, as shown in further detail in FIG. 4, for example in the layer or sheet. The aperture 32 functions to receive and/or support a plant-receiving receptacle 17 (with culture medium and a salt-tolerant plant), as shown in FIG. 4. For example, when the plant-receiving receptacle 17 is positioned in the aperture 32, the shoot of the salt-tolerant plant is in the air while the roots are suspended freely in the liquid 13 on which the platform 18 rests, as shown in FIGS. 1B-1C. When placed in the platform 18, the plant will ideally remain upright, with the roots below the water line. In some embodiments, the plant-receiving receptacle 17 is a planter, plug, planting pot, or any other suitable container for holding a plant. In some embodiments, the culture medium consists of or includes one or more of peat moss, polylite, vermiculite, perlite, coco coir, mineral wool (rock rool) or any other suitable growing medium. For example, in some embodiments, the culture medium is a 1:1 mixture of peat moss and polylite, a 1:1 mixture of perlite and vermiculite, or is formed of polylite alone.

In some embodiments, as shown in FIG. 4, the plant-receiving receptacle 17 is sized and configured to be received in an aperture 32 in a top surface 26 of the platform 18. In some embodiments, the plant-receiving receptacle 17 may be shaped as a cone, cube, three-dimensional hexagon, three-dimensional polygon, or otherwise shaped to be received in an aperture 32 in the layer or sheet. The plant-receiving receptacle 17 may comprise a plastic, biodegradable, wood, metal, recyclable, or renewable material. In one non-limiting embodiment, the plant-receiving receptacle 17 is a cone-shaped plastic or biodegradable material with a one inch diameter D1 top orifice 15, five inches in length L1, and three or more ¼ inch diameter ports 33a, 33b at the low part of the plant-receiving receptacle 17, and ¼ inch diameter D2 bottom orifice 19. However, it is to be understood by one of skill in the art that the plant-receiving receptacle may have any size, shape, or dimensions suitable for the application. The bottom orifice 19 allows the roots or a root system of the salt-tolerant plant to enter the liquid. In some embodiments, the plant-receiving receptacle 17 is positioned a length L2 above an aperture 32 in the layer or sheet. In some embodiments, the length L2 is between one and five inches. In one embodiment, the plant-receiving receptacle 17 is positioned a length L2 of two inches above an aperture 32 in the layer or sheet. In some embodiments, the plant-receiving receptacle 17 includes one or more primary ports 33a (also referred to herein as drainage or aeration ports), for example on a portion (e.g., length L2) of the plant-receiving receptacle 17 that is exposed above the top surface 26 of the platform 18. In one non-limiting example, the one or more drainage or aeration ports 33a provide aeration for a root system of the salt-tolerant plant and/or increase drainage of fresh water from the top surface 26 of the platform and/or the plant-receiving receptacle 17 (e.g., after precipitation). In some embodiments, as shown in FIG. 4, the plant-receiving receptacle 17 includes one or more secondary ports 33b (also referred to herein as root release ports). The root release ports 33b function to allow the root system of a salt-tolerant plant disposed in the plant receiving receptacle 17 to access the water through the one or more secondary ports 33b.

Returning to FIGS. 1A-1C, a top surface 26 and/or bottom surface 28 of the platform 18 may be self-floating or supported by other materials that allow the top surface 26 and/or bottom surface 28 of the platform 18 to rest on a surface of a liquid or be positioned above the liquid surface. For example, the top surface 26 and/or bottom surface 28 may be supported by two or more elongate members 34. The elongate members 34 may be pontoons, floating beams, pylons, or other floatable members. In some embodiments, the elongate members 34 are tethered to a sidewall, dock, floor, or bottom of the system; in other embodiments, the elongate members 34 are coupled to stilts, support beams, legs, or other supports in the system so that the platform rests on a liquid surface but does not necessarily float. In some embodiments, the top surface 26 and/or the bottom surface 28 is formed of one or more layers or sheets. The elongate members 34 may be positioned under a layer or sheet, for example coupled to the top surface 26 and/or bottom surface 28, or between two or more layers or sheets. In some embodiments, the elongate members 34 extend an entire length or width or a portion of the entire length or width of the layer or sheet, the top surface 26, and/or the bottom surface 28. The elongate members 34 may be any size or shape and configured to support the layer or sheet. For example, the elongate members 34 may be tubular, rectangular, triangular, hexagonal, or any other suitable shape. The elongate members 34 may be solid or hollow and/or flexible or rigid. For example, one or more elongate members 34 spanning a peripheral region of the platform may be rigid while one or more elongate members 34 spanning a central region of the platform may be flexible. The elongate members 34 may be open to the air or closed and filled with air. The air may include atmospheric air, oxygen, nitrogen, helium, carbon dioxide, hydrogen, and/or any other gas contributing to buoyancy. In some situations, the plants positioned in the top surface 26 may create the buoyancy in the platform 18 to keep the platform 18 afloat. The elongate member 34 may be partially submerged in the liquid or rest almost entirely on top of the liquid as a result of its buoyancy, while the bottom surface 28 may be partially or fully submerged in the liquid. The elongate member 34 may include plastic, polycarbonate, polyvinylbutyrate, polyamide, polyvinyl chloride, ethylenevinylacetate copolymer polyurethane, polystyrene, polyvinylidine, polypropylene, polyamides, polyacrylates, polycarbonates, bubble wrap, buoyant package filler material, composites, polysulfone, fiberglass, polyvinylidine difluoride, metallic materials, closed cell polymer foam, reclaimed materials, wood, metal, recyclable materials, and various other materials known to one of skill in the relevant art. The elongate members 34 may be stackable, rollable (e.g., configured with wheels or casters), foldable, and/or configured to be rolled, collapsed, folded, or packaged into a smaller or more discreet packet for easier transport. For example, the elongate members 34 may include one or more hinges to allow each elongate member to be folded upon itself for easy storage and/or transport. Alternatively or additionally, the elongate members 34 may be inflatable or deflatable. The elongate member 34 may positioned every one or two apertures 32 (e.g., use of five elongate members 34 for eight apertures 32 in one cross row).

In some embodiments, the barrier 36 helps retain the top surface 26 and/or bottom surface 28 of the platform 18 in the liquid by adding weight and increasing drag or resistance to movement in order to prevent the platform from flipping over as a result of wind or waves, especially when the plants on the platform are small and light.

In some embodiments, as shown in FIG. 3, the barrier 36 hangs from one or more elongate members 34 and/or the top surface 26 of the platform 18. In some embodiments, the barrier 36 resides between the top layer 26 and the bottom layer 28 or may extend beyond the bottom layer 28. The barrier 36 may include or be formed of a porous, permeable, or penetrable material, visible in FIG. 3 for example. The barrier 36 functions to protect the roots of the plants growing in the top surface 26 of the platform 18 from the water-dwelling animals in the system 10. The barrier 36 may include a net, mesh, network, screen, web, or other material configured to allow liquid and small particles to pass through but prevent the passage of animals and larger particles.

In some embodiments, as shown in FIGS. 1C-3, the platform 18 optionally includes a securing element 38, for example locking clips, cable ties, posts, T-posts, fence posts, or any other suitable means to secure the platform 18 to a sidewall, bottom wall, floor, dock, or other structure, for example, to prevent drifting and/or rotation of the platform 18. In some embodiments, the system 10 includes a plurality of platforms 18. Each platform may be linked or coupled to an adjacent platform using, for example, a coupling element such as cable ties, ropes, string, wires, or other means to form a multi-platform system.

Figure 6A:
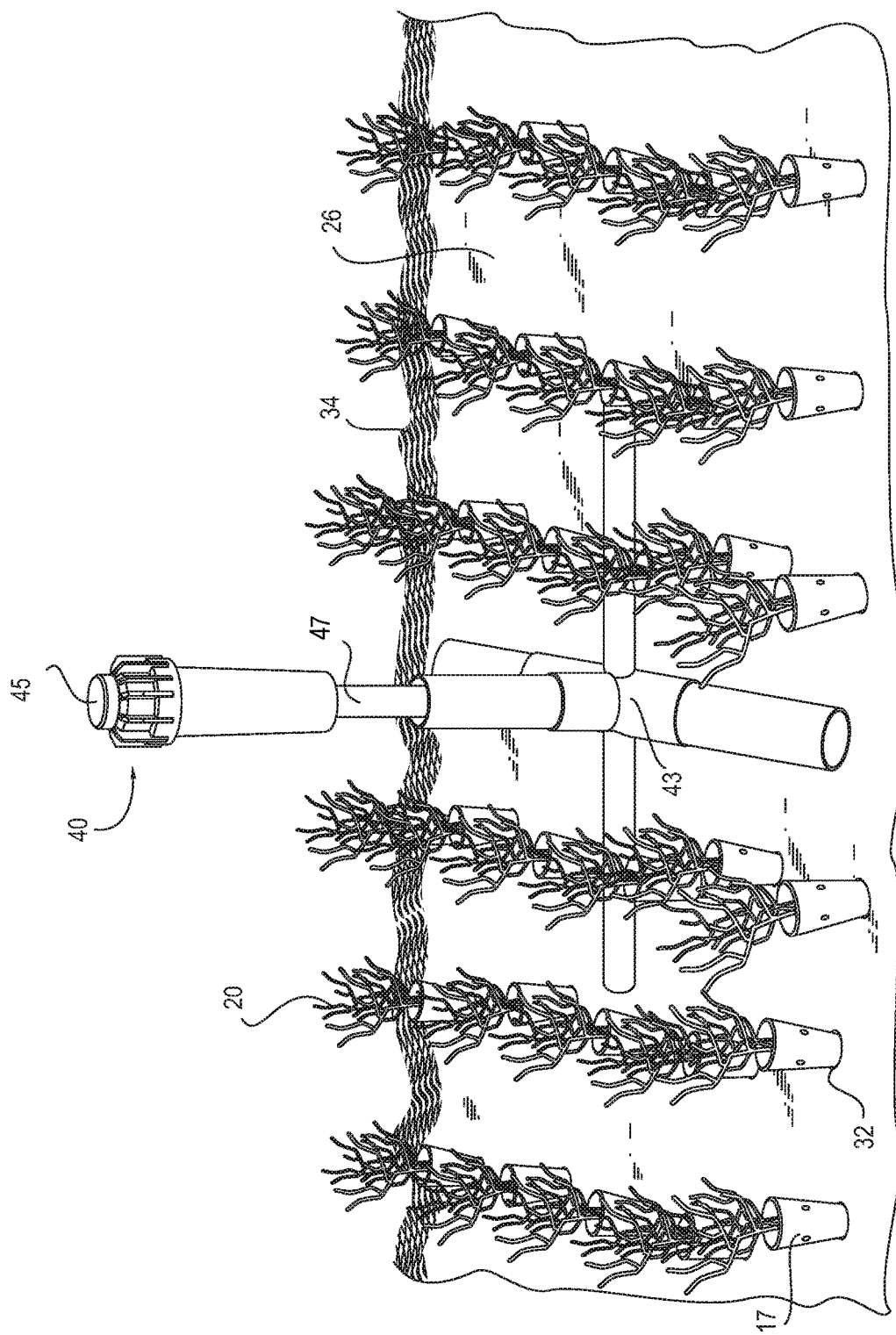
FIG. 6A illustrates a perspective view of one embodiment of an irrigation device.
Figure 6B:
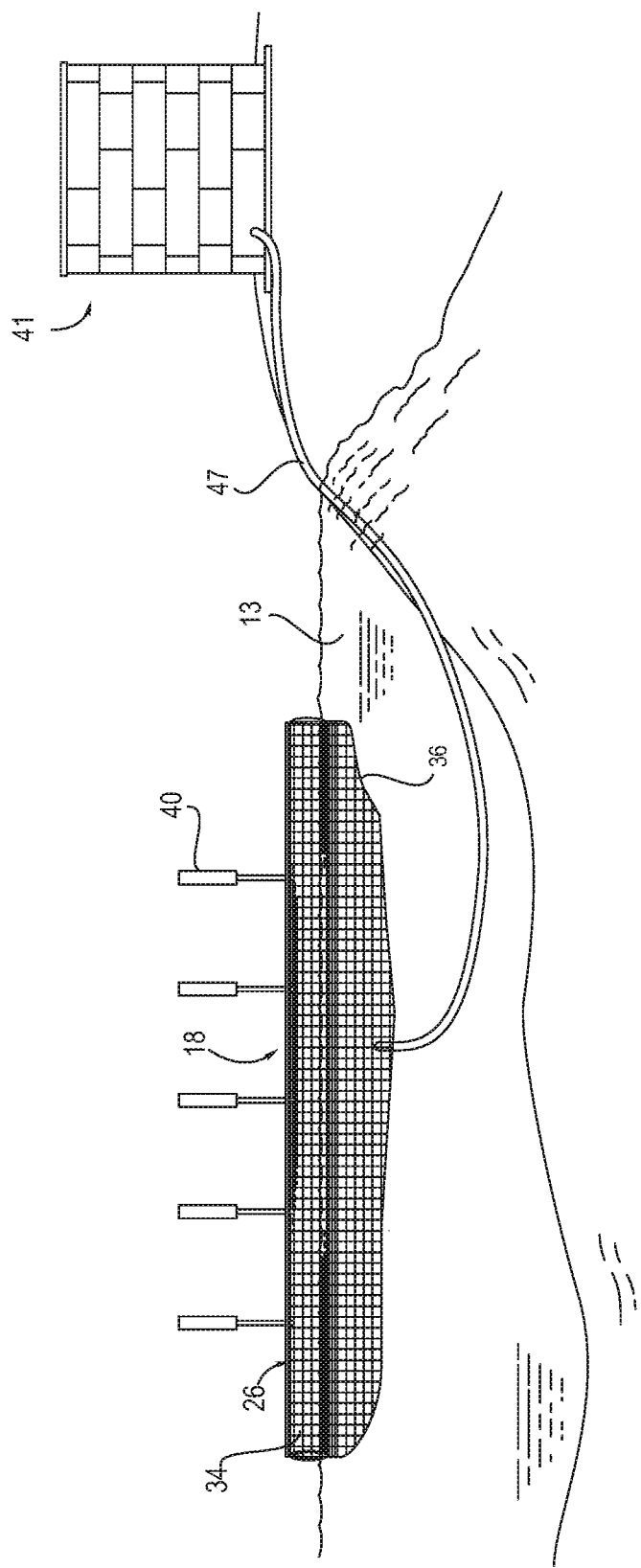
FIG. 6B illustrates a side view of one embodiment of an irrigation device.

In some embodiments, as shown in FIG. 3 and FIG. 6A, the top surface 26 of the platform 18 optionally includes an irrigation device 40. The irrigation device 40 functions to distribute a liquid, pesticide, chemical, fertilizer, or another substance to one or more plants disposed in the platform, one or more water-dwelling animals of the system, or one or more plants disposed in the lower level 16. In one embodiment, the irrigation device 40 is a saltwater distribution device. In some such embodiments, freshwater accumulation in the plant-receiving receptacle 17, on one or more portions of the salt-tolerant plant, the top surface 26 of the platform 18, and/or on the surface of the liquid 13 results in increased bacterial and fungal growth, insect hatching, caterpillar presence, and, in extreme cases, death of the salt-tolerant plants. The saltwater distribution device 40 functions to reduce or prevent these negative side effects of freshwater accumulation by irrigating the salt-tolerant plants positioned in the top surface 26 of the platform 18 with saltwater, for example brackish water. The saltwater distribution device 40 also functions to deter insects (e.g., caterpillars) from hatching, growing, or otherwise residing on the top surface 26 of the platform 18 or one or more portions of the plants growing on the platform 18. The irrigation device 40 may be operated manually (e.g., by a user of the system), mechanically, and/or automatically. For example, the irrigation device 40 may include a head 45 configured for localized irrigation, drip irrigation, a sprinkler irrigation, center pivot irrigation, lateral move irrigation, or any other irrigation method or device. One or more tubes, hoses, or conduits 47 connect the irrigation device 40 to a middle level of the system or a reservoir 41 that holds the substance for distribution, as shown in FIG. 6B. In some embodiments, the reservoir 41 is a well filled with, for example, brackish water, saltwater, freshwater, or any other type of liquid. In one embodiment, the reservoir 41 is filled with saltwater or brackish water. In some embodiments, the one or more tubes, hoses, or conduits 47 collect liquid from the middle level of the system and dispense the water to the top surface of the platform 18. The irrigation device 40 may further include a base 43 that distributes the weight of the irrigation device 40 on the top surface 26 of the platform 18 or maintains the irrigation device 40 in an upright configuration on the top surface 26 of the platform 18. In some embodiments, the irrigation device 40 is communicatively coupled to a sensor system as will be described in further detail elsewhere herein.

In some embodiments, as shown in FIG. 2 and FIG. 5A, the top surface 26 of the platform 18 optionally includes one or more sensors 42. The one or more sensors 42 function to collect data about: one or more environmental conditions surrounding or on the platform 18, an orientation of the platform 18, a growth status of one or more plants of the system 10, or any other parameter of the system 10. For example, in some embodiments, the sensors 42 collect data about one or more environmental conditions, including: a temperature, an amount of moisture, a salinity level, an amount of nitrogen, a pH, an amount of oxygen, an amount of carbon dioxide, an amount of a trace metal, an amount of a nutrient, a weather forecast (e.g., storm, sun, wind, rain, monsoon, etc.), an amount of precipitation, atmospheric pressure, an amount of sunlight, bacterial growth, fungal growth, caterpillar presence, algae growth, wind detection or direction, wave detection, and/or any other environmental condition that may affect the growth of one or more plants or any other functionality of the system. For example, a sensor 42 of the system may detect or measure nitrogen, nitrogen dioxide, pH, salinity, oxygen, carbon dioxide, turbidity of the liquid in the system, temperature, trace metals, nutrients, relative humidity, Dew point, wind direction, wind strength, wave swell, atmospheric pressure, an amount of rain fall, and/or any other gas, environmental condition, or substance known to one of skill in the relevant art. In some embodiments, as shown in FIG. 1B, the top surface 26 of the platform 18 may include a camera 23 for imaging one or more plants or conditions on the top surface of the platform 18, for example algal growth, fungal growth, caterpillar presence, etc.

A sensor 42 may be positioned on a top surface 26, bottom surface 28, side surface, or any surface of the platform. Alternatively or additionally, a sensor 42 may be coupled to a plant receiving receptacle 17, a penetrable barrier 36, an elongate member 34, a mesh surface of the platform 18, a barrier 36, a securing element 38 of the platform, an irrigation device 40, an aeration device 60, a water-dwelling animal 24, a portion of a salt-tolerant plant, or any other surface of the system.

In some embodiments, a sensor may include one or more of: a nitrogen sensor, a pH sensor, a salinity sensor, an oxygen sensor, a carbon dioxide sensor, a turbidity sensor, a temperature sensor, a trace metal analyzer, a nutrient analyzer, a relative humidity sensor, a Dew point sensor, a barometer, a photometer, a rain gauge, and a camera. The one or more sensors may measure a composition, feature (or amount thereof), characteristic (or amount thereof), or an amount of air surrounding the platform, a liquid on a surface of the platform, a liquid on which the platform is suspended, a composite in which a plant is growing, a presence of a pest on or surrounding the platform, or any other environment surrounding the platform.

In some embodiments, one or more sensors 42 measure a position and/or orientation of a platform 18 of the system. For example, the platform 18 may be oriented towards the east for sunrise and towards the west for sunset. The sensor 42 may include a gyroscope, global positioning system, accelerometer, compass, and/or any other positioning or orientation detecting device. For example, a natural rotation or orientation of the platform 18 resulting from liquid movement under the platform 18 may be measured using an accelerometer. Further, an orientation of the platform 18 may be measured, for example, as the result of one or more swells or waves, to ensure that the platform 18 does not become flipped upside down and/or to forecast a storm that may damage the platform 18 and/or one or more plants positioned on the platform 18.

In some embodiments, as shown in FIG. 1C, a platform 18 of the system includes an identification tag 27, for example in the form of a quick reference code, barcode, near-field communication chip, and/or any other type of identification tag. The identification tag 27 may be used to track one or more parameters of the platform 18, for example species of plants growing on the platform 18, growth conditions used in the system 10, species of water-dwelling animals in the system 10, frequency of irrigation, frequency of aeration, sensor data collected, production history for the platform, date of last harvest, etc.

Figure 5B:
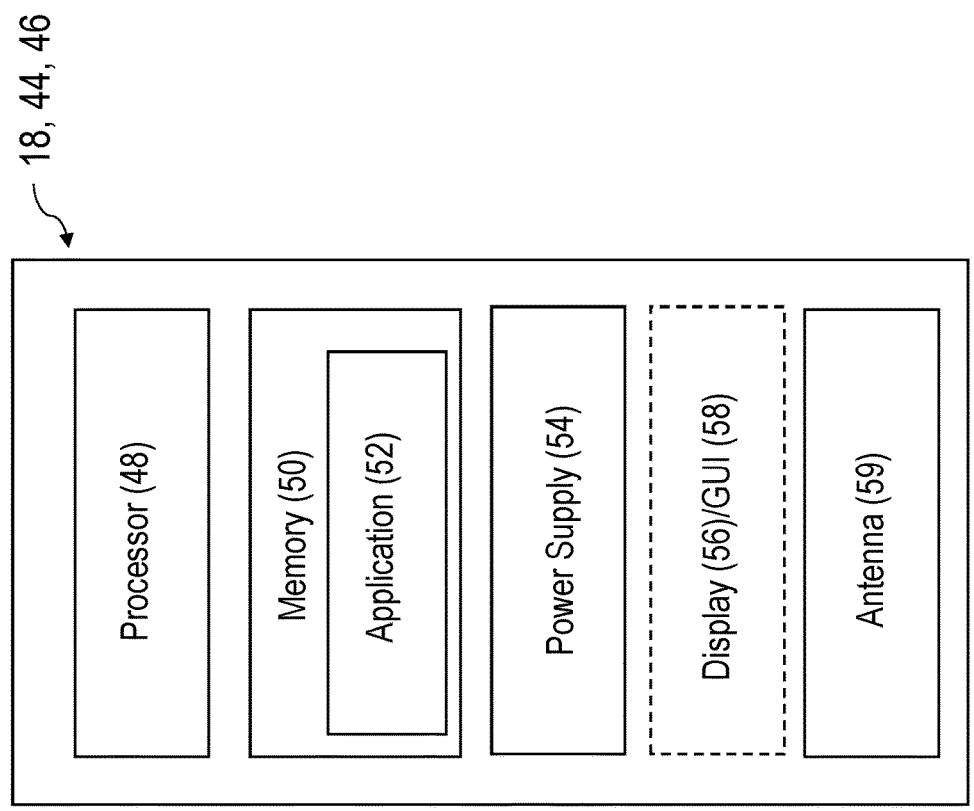
FIG. 5B illustrates schematically one embodiment of a computing device, server, or platform of a system for monitoring and/or controlling an environmental condition surrounding the platform or a feature of the system.

In some embodiments, as shown in FIGS. 5A-5B, one or more components (e.g., irrigation device, aeration device, sensors, identification tags, etc.) associated with the platform 18 or the platform 18 itself is communicatively coupled to a computing device 46 and/or a server 44 for unidirectional or bidirectional communication with the computing device 46 and/or server 44. Remote access to one or more system components through a computing device 46 and/or server 44 enables a user to monitor and/or control one or more system components remotely and/or in real-time. In some embodiments, the computing device 46 and/or server 44 receives a measurement or signal from a sensor 42 associated with the platform 18, a processor 48 of the server 44 or the computing device 46 analyzes the measurement or signal, and a processor 48 of the server 44 or the computing device 46 instructs the platform 18 and/or system to execute a set of instructions, as described elsewhere herein. In some embodiments, the server 44 or computing device 46 notifies a user of the system of the measurement or signal received from the platform 18 and/or one or more system components.

In some embodiments, a user of the system may be notified using a tactile, audible, or visual indicator. For example, a graphical user interface (GUI) of a computing device 46 may provide a visual indicator, such as a pop-up, notification, color change, flashing light or color, or other indicator to the user to indicate a status of the platform 18. The server 44 and/or computing device 46 may transmit or receive a call, short message service (SMS), email, page, fax, or other notification indicating a status of the platform 18. The computing device 46 may vibrate upon receipt of new sensor data or a change in a status of the platform 18. In some embodiments, a computing device 46 may emit an audible noise from a speaker associated with the computing device 46 to indicate a status of the platform 18.

As shown in FIG. 5A, there may be bidirectional communication between the platform 18 and server 44, platform 18 and computing device 46, and computing device 46 and server 44. For example, the platform 18 and/or the various components of the platform 18 (e.g., sensors, irrigation device, aeration device, etc.) may send, transmit, or export data to the computing device 46. The computing device 46 may receive and/or import the data from the platform 18 to analyze and/or display the data to a user. The data may further be transmitted to, stored on, and/or analyzed by a server 44. In some embodiments, sending or transmitting information occurs via a wired connection (e.g., IEEE 1394, Thunderbolt, Lightning, DVI, HDMI, Serial, Universal Serial Bus, Parallel, Ethernet, Coaxial, VGA, PS/2) or wirelessly (e.g., via Bluetooth, low energy Bluetooth, near-field communication, Infrared, WLAN, or other RF technology).

In some embodiments, the computing device 46 is a stationary computing device. In some such embodiments, the stationary computing device includes a desktop computer or workstation. In some embodiments, as shown in FIG. 5A, the computing device 46 is a mobile computing device. In some such embodiments, the mobile computing device includes a mobile phone, tablet, laptop, netbook, notebook, or any other type of mobile computing device. In some embodiments, the computing device 46 is a computational device, wrapped in a chassis that includes a display (visual with or without touch responsive capabilities), a central processing unit (e.g., processor or microprocessor), internal storage (e.g., flash drive), n number of components (e.g., specialized chips and/or sensors), and n number of radios (e.g., WLAN, LTE, WiFi, Bluetooth, GPS, etc.).

In some embodiments, as shown in FIG. 5A, the system may include a server 44. The server 44 may be a local server on the computing device or a remote server. In some embodiments, the server is a virtual server. In some embodiments, the server 44 may share data between the computing device 46 and the platform 18.

As shown in FIG. 5B, the computing device 46, server 44, and/or platform 18 of some embodiments includes a processor 48, for example, a general purpose microprocessor, a digital signal processor (DSP), a field programmable gate array (FPGA), an application specific integrated circuit (ASIC), or other programmable logic device, or other discrete computer-executable components designed to perform the functions described herein. The processor 48 may also be formed of a combination of computing devices, for example, a DSP and a microprocessor, a plurality of microprocessors, one or more microprocessors in conjunction with a DSP core, or any other suitable configuration. In some embodiments, the processor 48 is coupled, via one or more buses, to the memory 50 in order to read information from and write information to the memory 50. The memory 50 may be any suitable computer-readable medium that stores computer-readable instructions for execution by computer-executable components. In some embodiments, the computer-readable instructions include software stored in a non-transitory format, some such software having been downloaded as an application 52 onto the memory 50 of the computing device 46 or server 44. The processor 48, in conjunction with the software stored in the memory 50, executes an operating system and one or more applications 52. Some methods described elsewhere herein may be programmed as software instructions contained within the one or more applications 52 stored in the memory 50 and executable by the processor 48.

The computing device 46, server 44, and/or platform 18 further includes a power supply 54, such as a battery. The power supply 54 is electrically coupled to the processor 48 and other electronic components. The power supply 54 may be rechargeable or disposable.

The computing device 46 (and optionally, the server 44 and platform 18) further includes a display 56. The display 56 of the computing device 46 is configured to display one or more environmental conditions surrounding and/or on the platform on a GUI 58 and/or receive one or more inputs from a user, for example to control the functioning of one or more components of the system. In some embodiments, the display 56 includes a Thin Film Transistor liquid crystal display (LCD), in-place switching LCD, resistive touchscreen LCD, capacitive touchscreen LCD, organic light emitting diode (LED), Active-Matrix organic LED (AMO-LED), Super AMOLED, Retina display, Haptic/Tactile touchscreen, and/or Gorilla Glass. The GUI 58 may include controls, which enable a user to interact with the GUI 58. The GUI 58 may include buttons, sliders, toggle buttons, toggle switches, switches, dropdown menus, combo boxes, text input fields, check boxes, radio buttons, picker controls, segmented controls, steppers, and/or any other type of control. In some embodiments, the user may use different tactile or haptic lengths or pressures to navigate on the display. For example, a user may use a short press, long press, light press, or forceful press to navigate on the display.

In some embodiments, the GUI 58 includes access points that may require varying levels of permissions, as shown in FIG. 5A. For example, an administrator or manager of the system may be able to view, edit, and/or control various components of the system using the computing device 46 or server 44. A general user (i.e., User 1, User 2, User n) of the system may only be able to view the data and/or information about the system or the system components. In some embodiments, operators or harvesters of various components of the system may have access to view, edit, and/or control the subset of the various components for which they are responsible but view-only access for those system components for which they are not responsible.

The computing device 46, server 44, and/or platform 18 may further include an antenna 59 to transmit data between the computing device 46 and the server 44, the computing device 46 and the platform 18, and/or the server 44 and the platform 18. In some embodiments, the antenna 59 is configured as a transceiver; in other embodiments, the antenna 59 is configured as a transmitter or receiver.

Returning to FIG. 1A, the system optionally includes a middle level 14. The middle level may be an aqueous level comprising a liquid 13 and a water-dwelling animal 24 for propagation in the middle level 14. The middle level 14 functions to provide hydration and fertilization to the plants in the upper level 12 and the lower level 16. For example, in some embodiments, the water-dwelling animal 24 in the middle level 14 consumes plant debris in the system 10 and supplies nutrients and fertilizer (e.g., nitrogen, phosphates, trace elements, etc.) to the plants in the upper 12 and lower 16 levels.

Further as shown in FIG. 1A, the system optionally includes a lower level 16, which includes a fully-submerged second salt-tolerant plant. The lower ground level 16 functions to provide a surface for growing a second salt-tolerant plant 22 (e.g., seaweed or ogo). The lower level 16 includes soil, dirt, fertilizer, compost, or any other matter for providing nutrients that support plant growth. The second salt-tolerant plant 22 in the lower level 16 functions to provide oxygen to the water-dwelling animal 24 and the first salt-tolerant plant 20 in the system 10.

As a non-limiting example, the second salt-tolerant plant 22 (e.g., seaweed) requires clean water for optimal growth, but the water-dwelling animals in the system would normally cause the liquid in the system to become turbid, murky, and/or full of contaminants. However, the first salt-tolerant plant 20 (e.g., a sea asparagus plant) cohabitating in the system cleans the water (e.g., kills algae growing in the water) to improve the growing conditions for the second salt-tolerant plant 22 (e.g., seaweed plant). Further, the water-dwelling animal 24 provides fertilizer for the seaweed plant so that the seaweed plant has increased chlorophyll along the length of its shoots.

In some embodiments, as shown in FIG. 7A and FIG. 7B, the lower level 16 optionally includes an aeration device or system 60. The aeration device or system 60 functions to disturb settlement and debris on the lower level 16 of the system (e.g., to distribute fertilizer and nutrients to various areas or levels of the system) and to increase oxygen in the system. The aeration device 60 disturbs the settlement and debris through agitation. The agitation may include manual agitation (e.g., through user-induced movement in the system by the user moving about in the system), mechanical agitation (e.g., propeller, forced air, etc.), or any other means. In one embodiment as shown in FIGS. 7A-7B, the system includes a mechanical aeration device. The mechanical aeration device includes one or a series of pipes or conduits 62 on a lower level 16 or beneath a lower level 16 of the system, as shown in FIG. 7A. In some embodiments, the series of pipes or conduits 62 follow an outline of the system or track along one or more walls, sidewalls, or barriers of the system, as shown in FIG. 7A. The series of pipes or conduits 62 are connected to an air pump 64 and include one or more apertures or termini 66 directed towards the sediments on the bottom of water body through which air or oxygen passes to be dispelled into the system.

In two non-limiting examples, the air pump 64 may be a reciprocating pump or a rotary pump. The reciprocating pump includes a piston that moves back and forth inside a cylinder, alternately drawing in air from outside and pushing air into the system. One or more valves ensure that the air drawn into the pump 64 is forced through the series of pipes or conduits 62 and is not released out of the system.

A rotary pump includes an impeller or propeller. The blades mounted on the impeller draw air through an inlet pipe, and then force the air out through an outlet pipe, for example through the series of pipes or conduits 62, usually pointed in the opposite direction.

In some embodiments in which the system is adapted or configured for a pool or tank, a waste removal device or system may replace or complement an aeration device or system. In closed system variations of the system or in variations in which the number of water-dwelling animals in the system exceeds the fertilizer and/or nutrient requirements of the system, a waste removal system or device may be included in the system. The waste removal device or system functions to remove excess waste created by water-dwelling animals in the system, for example as a result of over propagation of the water-dwelling animals or increased inclusion of water-dwelling animals in the system. For example, a waste removal device or system may include a filtration system that pumps the liquid in the system through a filter or a series of filters to remove waste from the system. In some embodiments, one or more filtering organisms may be added to the system, for example fish, annelids, rotifers, saprophytes, or macrophytes may be included in the system.

In some embodiments, one or more system components, for example the air pump 64, irrigation device 40, waste removal device, and/or sensors 42, are powered by one or more solar panels, geothermal, an electric grid, gas-powered generator, hydropower, wind turbines, or any other renewable or non-renewable power source.

In some variations, one or more system components are sold, marketed, advertised, or otherwise packaged together as a kit. In some embodiments, a kit may include a platform, one or more salt-tolerant plants (e.g., a seaweed plant and/or a sea asparagus plant), one or more plant-receiving receptacles, a water-dwelling animal, an irrigation device or system, an aeration device or system, a sensor system, and/or one or more instructions for setting-up, configuring, or otherwise arranging the system in a location.

Methods

Figure 8:
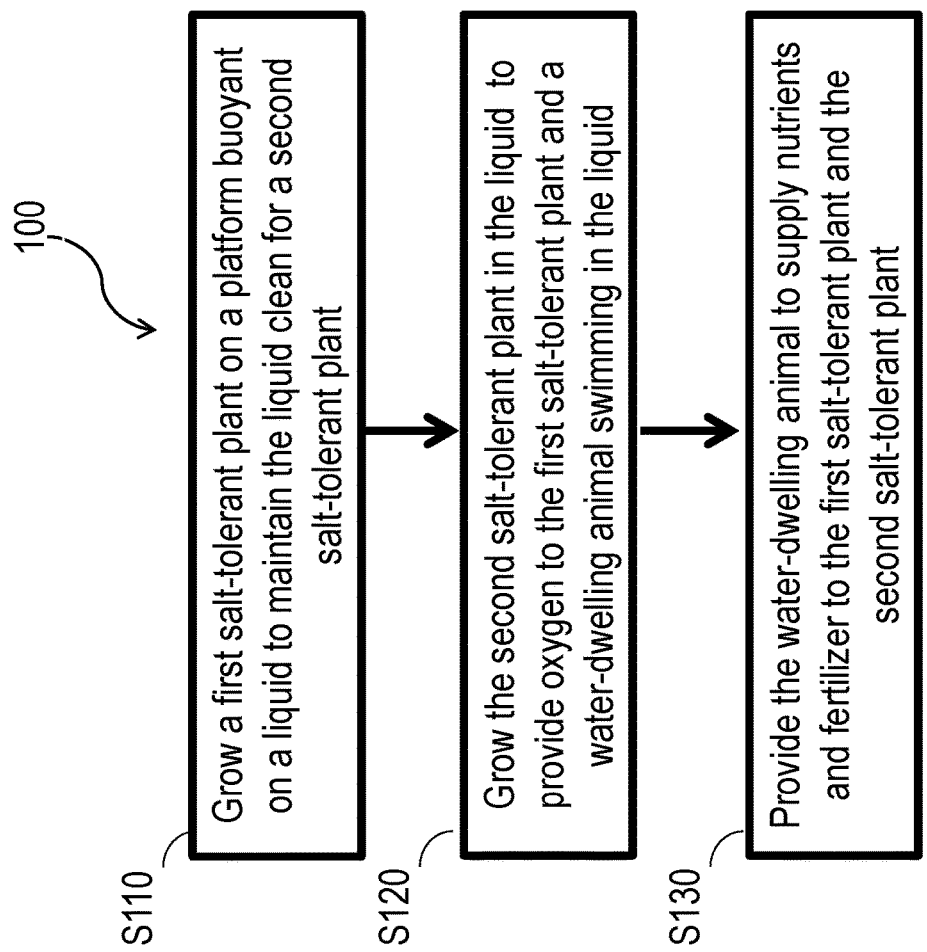
FIG. 8 shows a flow chart of one embodiment of a method of co-culturing salt-tolerant plants.

As shown in FIG. 8, a method 100 for symbiotic growth of salt-tolerant plants of one embodiment includes growing a first salt-tolerant plant on a platform suspended on a liquid, buoyant on a liquid, or otherwise substantially on a surface of a liquid to maintain the liquid clean for a second salt-tolerant plant S110, growing the second salt-tolerant plant in the liquid to provide oxygen to the first salt-tolerant plant and a water-dwelling animal present in the liquid S120, and providing the water-dwelling animal in the liquid to supply nutrients and fertilizer to the first salt-tolerant plant and the second salt-tolerant plant S130. The method functions to provide an environment in which a variety of salt-tolerant plants (e.g., sea asparagus and seaweed plants) thrive. The method is used in the hydroponics field, but can additionally or alternatively be used for any suitable applications, agricultural or otherwise.

As shown in FIG. 8, one embodiment of a method 100 for symbiotic growth of salt-tolerant plants includes block S110, which recites growing a first salt-tolerant plant on a platform suspended on a liquid, buoyant on a liquid, or otherwise substantially on a surface of a liquid to maintain the liquid clean for a second salt-tolerant plant. Block S110 functions to kill, remove, or otherwise decrease an amount of algae growing in the liquid. Algae inhibit productive growth or cultivation of some plants (e.g., seaweed), especially in the presence of water-dwelling animals. Introducing another salt-tolerant plant (e.g., sea asparagus) into the system suppresses the algae and cleans the liquid for improved growth of submerged seaweed plants in the system and supplies carbon dioxide for the seaweed plants. This is a key toward the sustainability of the multi-level saline aquaculture system.

In some embodiments, S110 includes measuring a turbidity or pH of the liquid with a sensor of the system. The turbidity or pH may be detected and measured automatically by the sensor, for example, at regular intervals or when triggered by a changed condition, or the turbidity or pH may be measured when prompted by a user. Alternatively or additionally, algae or fungus growth or caterpillar presence on a surface of the platform may be visualized by a camera and the images from the camera processed to detect algae or fungal growth. In such embodiments, a pixel intensity, coloration, or other parameter of the image may be compared over time to previous images for regions of the platform in which no plant, algae, or fungal growth or caterpillar presence is expected.

In some embodiments, S110 includes determining a degree of algae growth automatically with a processor communicatively coupled to the sensor, for example based on turbidity, pigment (e.g., green chlorophyll), or other algae-specific markers. The method may further include automatically determining, with a processor, if algae growth has reached a threshold, and if it has reached the threshold, irrigating the platform with brackish or salt water and/or administering an effective amount of an algae growth inhibitor or chemical to reduce algae growth or promote growth of the first salt-tolerant plant. In some embodiments, the administration of brackish water, salt water, algae growth inhibitor, or other chemical is performed manually; in other embodiments, the processor instructs components of the system to perform it automatically. In some embodiments, the method may include automatically determining an amount of pigment in the liquid, for example from chlorophyll accumulation as a result of algae accumulation. When the amount or concentration of pigment in the liquid reaches a threshold, indicating the content of algae is high and the plants are getting weak, the system automatically alerts the user to enhance the plant growth or make a replacement with new plants to control the growth of algae. Because, as mentioned elsewhere herein, growing sea asparagus limits or inhibits an amount of algae in the system. In other embodiments, the system automatically administers an algae growth inhibitor or chemical, activates an ultraviolet light, or activates a filtration device in the system.

As shown in FIG. 8, one embodiment of a method 100 for symbiotic growth of salt-tolerant plants includes block S120, which recites growing the second salt-tolerant plant in the liquid to provide oxygen to the first salt-tolerant plant and to a water-dwelling animal swimming in the liquid. Block S120 functions to increase oxygen in the system for the plants growing on the platform and the water-dwelling animal swimming in the liquid.

As shown in FIG. 8, one embodiment of a method 100 for symbiotic growth of salt-tolerant plants includes block S130, which recites providing the water-dwelling animal within the liquid to supply nutrients and fertilizer to the salt-tolerant plants in the system. Block S130 functions to provide nutrients and fertilizer in the system. Typically, some plants (e.g., seaweed) cannot grow in closed systems with fish without significant filtration systems and supplemental carbon dioxide pumped into the system. However, in this system, one or more salt-tolerant plants (e.g., sea asparagus) may act as a filter, cleaning the water for the additional plants in the system (e.g., seaweed) to improve propagation of the plants (e.g., seaweed). Further, in some embodiments, one or more plants (e.g., sea asparagus) in the system may provide increased carbon dioxide for other plants (e.g., seaweed) in the system.

The method may further include measuring an amount of nitrogen, nitrogen dioxide, trace metal(s), phosphate, or one or more nutrients in the system, for example in the liquid. In some embodiments, the nutrients are measured with a sensor automatically (for example, at regular intervals or when triggered by a changed condition) or when prompted by a user. In some embodiments, if the detected amount is above or below a threshold, a processor may perform additional operations. Alternatively or additionally, if the detected amount is below a threshold, the system may be manually or automatically supplemented with additional nitrogen, nitrogen dioxide, trace metal(s), phosphate, one or more nutrients, etc. In some embodiments, if the detected amount is above a threshold, the system may be manually or automatically filter out or remove the excess nitrogen, nitrogen dioxide, trace metal(s), phosphate, one or more nutrients, etc. from the system.

In some embodiments, a threshold is calculated or empirically determined based on the species of plants and water-dwelling animals in the system. For example, a threshold carbon dioxide level in the liquid may be between 1000 parts per million (ppm) and 2000 ppm, 500 ppm and 2500 ppm, 1250 ppm and 1750 ppm, 1000 ppm and 1500 ppm, 1500 ppm and 2000 ppm, or any range or subrange there between.

In some embodiments, performing additional operations includes one or more of: notifying a user of the detected amount, detected change, a characterization of the amount, or a warning; recommending a course of action to the user (e.g., turning on or off an irrigation device or an aeration device, rotating the platform, etc.); contacting a specialist (for example a hydrologist, horticulturalist, etc.) by SMS text, phone, email, or other communication means; and automatically changing the operations of one or more components of the system (e.g., automatically turning on or off an irrigation device or an aeration device, rotating the platform, etc.).

Figure 9:
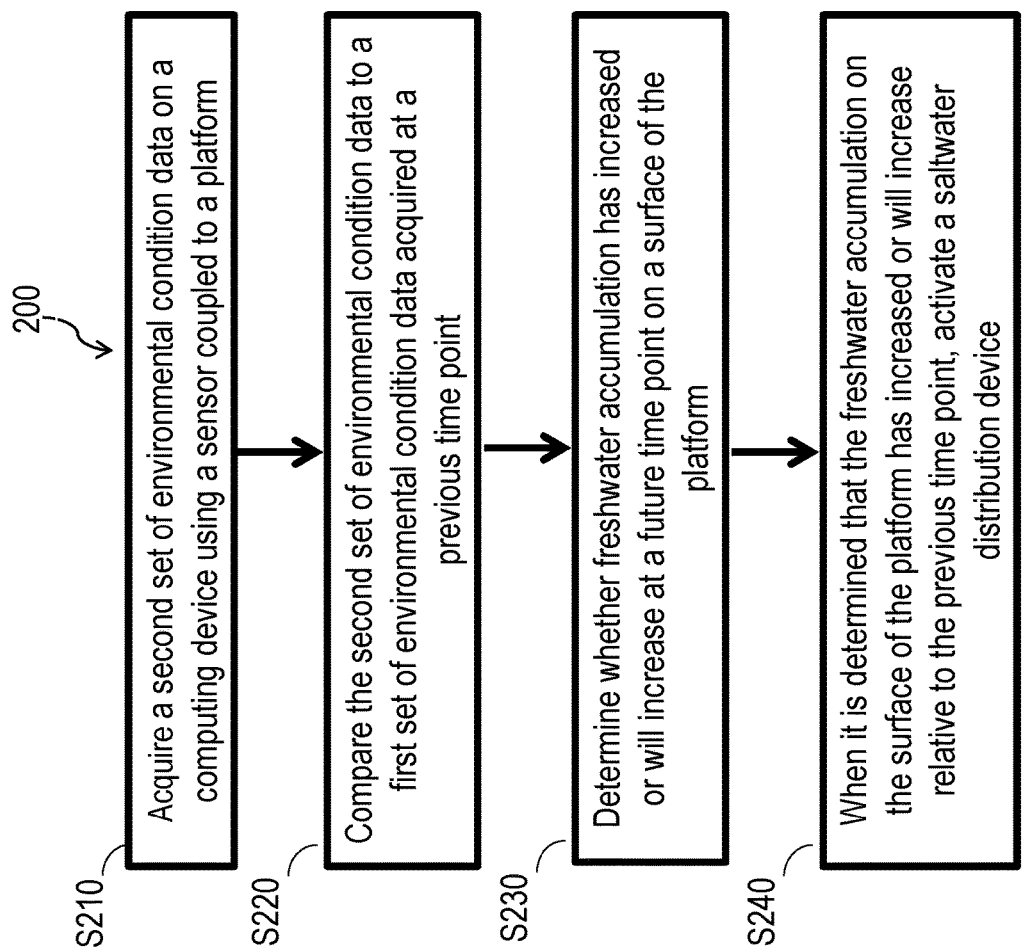
FIG. 9 shows a flow chart of one embodiment of a method of irrigating a saline aquaculture system.

As shown in FIG. 9, a computer-implemented method 200 of irrigating a saline aquaculture system includes acquiring a second set of environmental condition data on a computing device using a sensor coupled to a platform S210; comparing, using the computing device, the second set of environmental condition data to a first set of environmental condition data acquired at a previous time point S220; determining whether freshwater accumulation has increased or will increase at a future time point on a surface of the platform S230; and when it is determined that the freshwater accumulation on the surface of the platform has increased or will increase relative to the previous time point, activating a saltwater distribution device S240. The method functions to decrease fungal and/or bacterial growth on one or more portions of the plants and/or the platform and/or to reduce insect (e.g., caterpillar) presence on one or more portions of the plants and/or on or around the platform. The method is used in the hydroponics field, but can additionally or alternatively be used for any suitable applications.

Previous research has indicated that distributing saltwater on soil results in reduced survival of even salt-tolerant plants because the salt accumulates in the soil resulting in increased soil salinity over time. The salt-tolerant plants on a surface of the platform are grown in soil-like culture medium in one or more plant-receiving receptacles. Thus, based on previous research, it would be expected that irrigating a surface of the platform with saltwater would result in reduced salt-tolerant plant survival because salt would accumulate in the soil-like culture medium over time. Further, current mechanisms of controlling pests on terrestrial plants include pesticides, chemicals, and genetic engineering. However, chemicals and pesticides are more tightly regulated or restricted in marine environments making pest control almost impossible. However, unexpectedly as shown in the EXAMPLE, adding or increasing distribution of saltwater on a surface of the platform and on a surface of the water resulted in improved salt-tolerant plant survival. Distributing saltwater on a surface of the platform resulted in reduced accumulation of insects and caterpillars on the platform and the salt-tolerant plants; and overall improved survival of the salt-tolerant plants, especially after monsoon-like or storm conditions.

As shown in FIG. 9, one embodiment of a computer-implemented method 200 of irrigating a saline aquaculture system to control pests includes block S210, which recites acquiring a second set of environmental condition data on a computing device using a sensor coupled to a platform. As described elsewhere herein, an environmental condition may be detected by a processor receiving data signals from a sensor, such as any of the sensors described elsewhere herein. The second set of environmental data may be acquired one second, one minute, one hour, one day, one week, one month, one year, one decade, or any other period of time after a first set of environmental condition data, as described in further detail elsewhere herein. The relationship between the first set and the second set of environmental condition data is that the first set precedes, comes before, is acquired before, is in the past relative to the second set, or is acquired previously to the second set. The second set of environmental condition data is acquired at a present time, a current time, a time period after the first set is acquired, proceeding the first set, or at a future time point relative to the first set of environmental condition data. Additional sets of environmental condition data may be acquired, for example third, fourth, fifth, sixth, seventh, nth sets of environmental condition data, such that a pattern may be established and/or an accurate weather or condition forecast may be predicted.

The environmental condition may include one or more of: a temperature, a moisture level, a salinity content, a nitrogen level, a pH, an oxygen level, a carbon dioxide level, a trace metal level, a nutrient level, a weather forecast, a weather history, an amount of precipitation, a humidity level, a sunlight intensity, bacterial growth, fungal growth, a caterpillar presence, an algae level or growth, a change in temperature (e.g., indicating a front or storm moving in), a change in humidity (e.g., indicating a front or storm moving in), a change in atmospheric pressure (e.g., indicating a front or storm moving in), heavy rain followed by sunny or hot days (i.e., monsoon), or any other environmental condition.

As shown in FIG. 9, one embodiment of a computer-implemented method 200 of irrigating a saline aquaculture system to control pests includes block S220, which recites comparing, using the computing device, the second set of environmental condition data to a first set of environmental condition data acquired at a previous time point. The previous time point may be a second, minute, hour, day, week, year, decade, or any timeframe or period in the past, before the second set of environmental condition data is acquired. In some embodiments, the first and/or second environmental condition data is analyzed including filtering, normalizing, segregating, or otherwise parsing the environmental condition data. In some embodiments, analyzing includes digitizing the environmental condition data. In some embodiments, analyzing includes automatically calculating an amount of a substance (e.g., oxygen, nitrogen, carbon dioxide, precipitation, etc.). Analyzing may include combining the environmental condition data from two or more sensors to create a weather forecast, to determine weather conditions from a past day, or to determine if there is or will be an accumulation of freshwater on a surface of the platform.

In some embodiments, comparing may include determining a trend, detecting a pattern, or predicting a future weather pattern or weather forecast. Comparing may include calculating a difference between a value, level, amount, concentration, or unit of an environmental condition measured in the second set and a value, level, amount, concentration, or unit of an environmental condition measured in the first set. Comparing may include deriving an average, mean, standard deviation, median, other statistical parameter, or other mathematical relationship to identify or determine a pattern, a trend, a forecast, a previous set of events (e.g., storm, rain, sun, high humidity, etc.), or any other parameter, feature, or characteristic.

In some embodiments, the value, level, amount, concentration, or unit of an environmental condition may include chemical contents of the liquid, for example nitrogen content of the liquid, pH of the liquid, oxygen content of the liquid, carbon dioxide content of the liquid, trace metal content of the liquid, nutrient composition of the liquid, or phosphate content of the liquid. In some embodiments, if a nitrogen or nitrate level of the system is above a predetermined threshold, the system may automatically activate a filtration system to reduce the nitrogen or nitrate levels. Alternatively, if the chemical content of the liquid is above or below a predetermine threshold, a user of the system may be notified so that the chemical content may be adjusted or corrected. In some embodiments, a processor of the system may notify the user of the chemical content amount and/or of recommended actions to take. For example, a user may be advised to add an acid or base to the system to correct a pH of the system; add salt-tolerant plants or water-dwelling animals to the system to balance nutrients, oxygen, and nitrogen in the system; or any other suitable actions. Such actions may be initiated by the user or the system (automatically or following user authorization) to adjust a chemical content of the liquid.

In some embodiments, the value, level, amount, concentration, or unit of an environmental condition may include: a measurement of humidity, a measurement of dew point, a measurement of temperature of the liquid or surrounding air, a measurement of precipitation, or any other parameter indicative of an environmental condition surrounding and/or on the platform. In some embodiments, if a measurement of humidity, dew point, or any other environmental condition is above or below a predetermined threshold, a user may be notified to harvest one or more salt-tolerant plants or activate or deactivate one or more system components (e.g., irrigation device, filtration system, etc.).

As shown in FIG. 9, one embodiment of a method 200 of irrigating a saline aquaculture system includes block S230, which recites determining whether freshwater accumulation has increased or will increase at a future time point on a surface of the platform. As described elsewhere herein, increasing an amount of saltwater on a surface of the platform, and thus at the water surface, reduces the growth of bacteria, algae, and fungi and the presence of caterpillars. Block S230 may include comparing, using a processor, an amount of precipitation measured in the first set of environmental condition data to an amount of precipitation measured in the second set of environmental condition data to determine if freshwater has accumulated in the time period between acquiring the first set and second set of environmental condition data. In some embodiments, an amount of precipitation is measured by a rain gauge. In some embodiments, block S230 includes determining if it is currently or actively raining, for example by determining in real time if an amount of precipitation in a rain gauge is actively increasing.

Method 200 or block S230 may further include determining a salt content of the water to determine if the water is freshwater or saltwater. For example, if the water has a salt content between 5 and 10, 10 and 20, 20 and 30, 30 and 40, or greater than 40 parts per thousand, then the system may determine that the water is salt water. If the water has a salt content of between 0 and 5, 5 and 10, 10 and 20, 20 and 30, or less than 40 parts per thousand, the system may determine that the water is freshwater. In some embodiments, the system may also determine a sunlight intensity; a number of minutes, hours, or days of sunlight; or any other sunlight parameter to determine if a degree of evaporation has occurred, such that the amount of fresh water is actually less than that measured by a precipitation sensor, for example a rain gauge. Alternatively or additionally, the system may determine a level of humidity, for example using a hygrometer, to determine if little to no evaporation has occurred. For example, high humidity would be indicative of reduced evaporation, while low humidity would be indicative of increased evaporation.

As shown in FIG. 9, one embodiment of a method 200 of irrigating a saline aquaculture system to control pests includes block S240, which recites when it is determined that the freshwater accumulation on the surface of the platform has increased, is increasing, or will increase relative to the previous time point, activating a saltwater distribution device. If environmental conditions are such that increased bacterial, algal, or fungal growth or caterpillar presence is likely, for example due to increased humidity or freshwater accumulation, the system may automatically activate the saltwater distribution device. Alternatively or additionally, the method may include sending a notification to a user indicating that the saltwater distribution device was activated automatically or recommending that the saltwater distribution device be activated by the user. In some embodiments, the method includes photographing a surface of the platform and sending a notification to a user. The notification may include an image of the surface of the platform depicting any bacterial, fungal, or algal growth or caterpillar presence on the platform. In some embodiments, the method includes receiving a user input that determines a status of the saltwater distribution device. The status may be off, light saltwater distribution, or heavy saltwater distribution. For example, based on the forecast, the user may indicate that only light saltwater is needed on a surface the platform. Alternatively, for example, the forecast may be inaccurate such that no precipitation occurs, such that the user indicates that no saltwater irrigation is required. In some embodiments, the method includes analyzing the environmental condition data to determine a probability that the system will experience an increase in fresh water moisture; displaying the probability to the user; and/or recommending a saltwater irrigation device status based on the probability. A probability, notification, and/or recommendation may be displayed to a user for any sensor data acquired by the system.

In some embodiments, a first, second, third, nth set of environmental condition data may be compared or enriched by a weather forecast provided by a third party source. For example, the first, second, third, nth set of environmental condition data may be compared to, blended with, added to, or otherwise modified by a weather forecast provided by a third party source.

In some embodiments, the method 200 further includes reducing an accumulation of one or more of: insects, caterpillars, fungi, and bacteria on the surface of the platform. As shown in the EXAMPLE, control of caterpillars on one or more salt-tolerant plants in the system is unexpectedly accomplished by irrigating the one or more salt-tolerant plants with saltwater. As described herein, saltwater or brackish water acts as an organic pesticide to reduce accumulation of caterpillars and increase an overall health and harvestability of the salt-tolerant plants (e.g., sea asparagus) in the saline aquaculture system.

Figure 10:
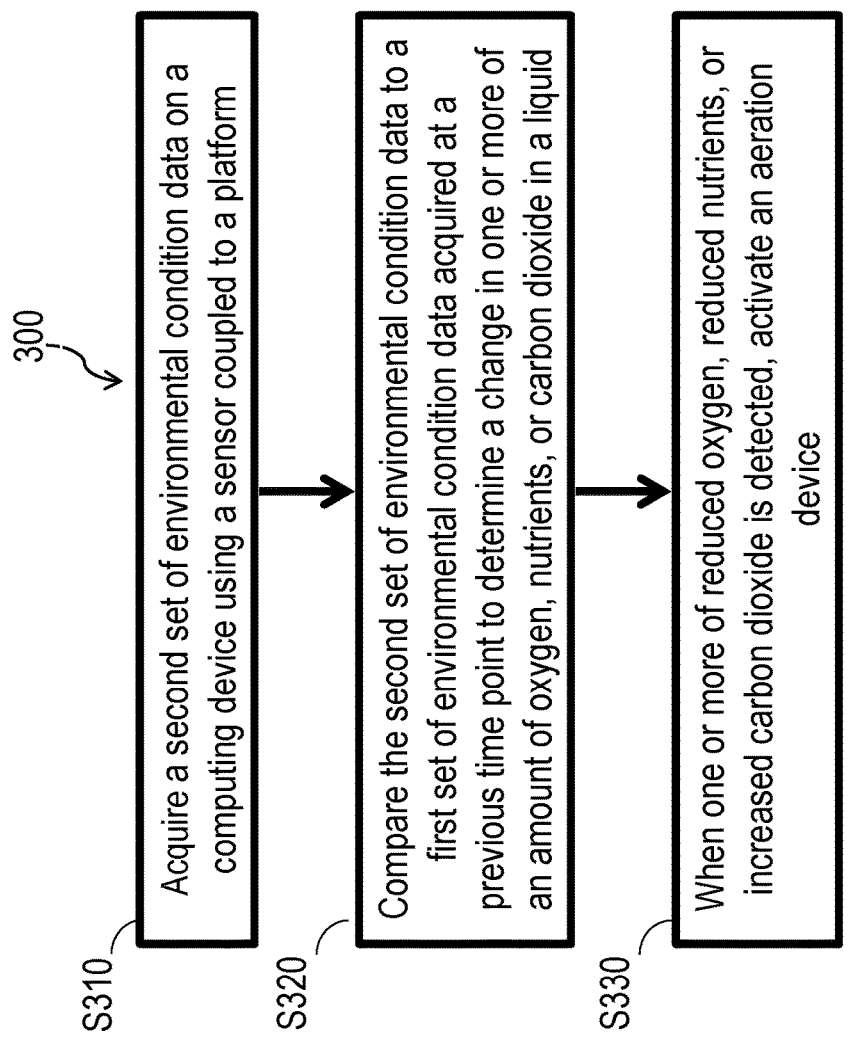
FIG. 10 shows a flow chart of one embodiment of a method for aerating and/or distributing nutrients in a saline aquaculture system.

As shown in FIG. 10, a method 300 of aerating or distributing nutrients in a saline aquaculture system includes: acquiring a second set of environmental condition data on a computing device using a sensor coupled to a platform 310; comparing the second set of environmental condition data to a first set of environmental condition data acquired at a previous time point to determine a change in one or more of an amount of oxygen, nutrients, or carbon dioxide in a liquid 320; and when one or more of reduced oxygen, reduced nutrients, or increased carbon dioxide is detected, activating an aeration device 330. The method 300 functions to distribute nutrients, for example from the water-dwelling animals, in the system that have settled out from the liquid and/or to increase oxygenation (i.e., reduce carbon dioxide) of the liquid to benefit one or more salt-tolerant plants in the system.

The method 300 may be used in a closed system, for example, a pond (e.g., manmade or natural), lake, tank, or other fully enclosed body of water where nutrients, oxygen, and/or carbon dioxide may not fluctuate drastically and there is significant control over system parameters, features, and/or characteristics.

In some embodiments of method 300, comparing includes determining a difference between the second set of environmental conditions and the first set of environmental conditions, such that an increase, decrease, or consistency in an environmental parameter, for example oxygen, nutrients, or carbon dioxide may be detected.

In some embodiments, the method further includes activating a filtration device, activating an aeration device, cycling in new water (e.g., freshwater or saltwater), or recycling the water to alter or change an amount, level, concentration, or unit of an environmental condition.

In some embodiments, the method includes determining a level, amount, concentration, or unit of the environmental condition and determining if that level, amount, concentration, or unit of the environmental condition exceeds a threshold. When the environmental condition reaches or surpasses the threshold, an aeration device or filtration device may be activated.

Returning to FIG. 5A, one embodiment of a method of collecting environmental data includes: collecting data about one or more environmental conditions using one or more sensors 42 on a surface of the platform 18; sending, uploading, or exporting the data in real-time to a server 44 and/or computing device 46 remote from the platform 18; and monitoring and/or controlling the environmental conditions remotely in real-time using the computing device 46. Monitoring or controlling environmental conditions may include: repositioning or redirecting one or more solar panels for powering the platform 18; activating or deactivating one or more wind turbines for powering the platform 18; rotating one or more platforms 18; activating or deactivating the irrigation device 40, aeration device 60, and/or filtration device; sending instructions to one or more users for harvesting one or more plants; irrigating the one or more salt-tolerant plants (e.g., a sea asparagus plant); and/or aerating one or more salt-tolerant plants (e.g., a seaweed plant).

The methods described herein may be implemented partly or fully or executed partly or fully using a processor 48 in the computing device 46, server 44, and/or the platform 18, as described elsewhere herein.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor on the server and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

EXAMPLE

Caterpillars are comment insects in saline aquaculture systems. Caterpillars cause significant damage to the production of hydroponically grown sea asparagus especially in the rainy season (i.e., winter). Many pesticides applied in land based agriculture systems are restricted in aquatic environments.

Saltwater has not previously been used as a pesticide in agriculture. Caterpillars are commonly found on many land plants, but not typically found on salt-tolerant plants on the beach or sandy areas. When rain has occurred, the surface water in the saline aquaculture system has reduced salt content and freshwater accumulates on the surface of the platforms in which sea asparagus is grown. As a result of this increase in fresh water in the surface water and on the platform, the sea asparagus shoots have reduced salt content due to absorbing fresh water from both the shoots and roots. However, as described herein, it is possible to repel caterpillars on the sea asparagus by restoring the salt content of the sea asparagus by irrigating the sea asparagus with saltwater before, during, and/or after raining.

Figure 11A:
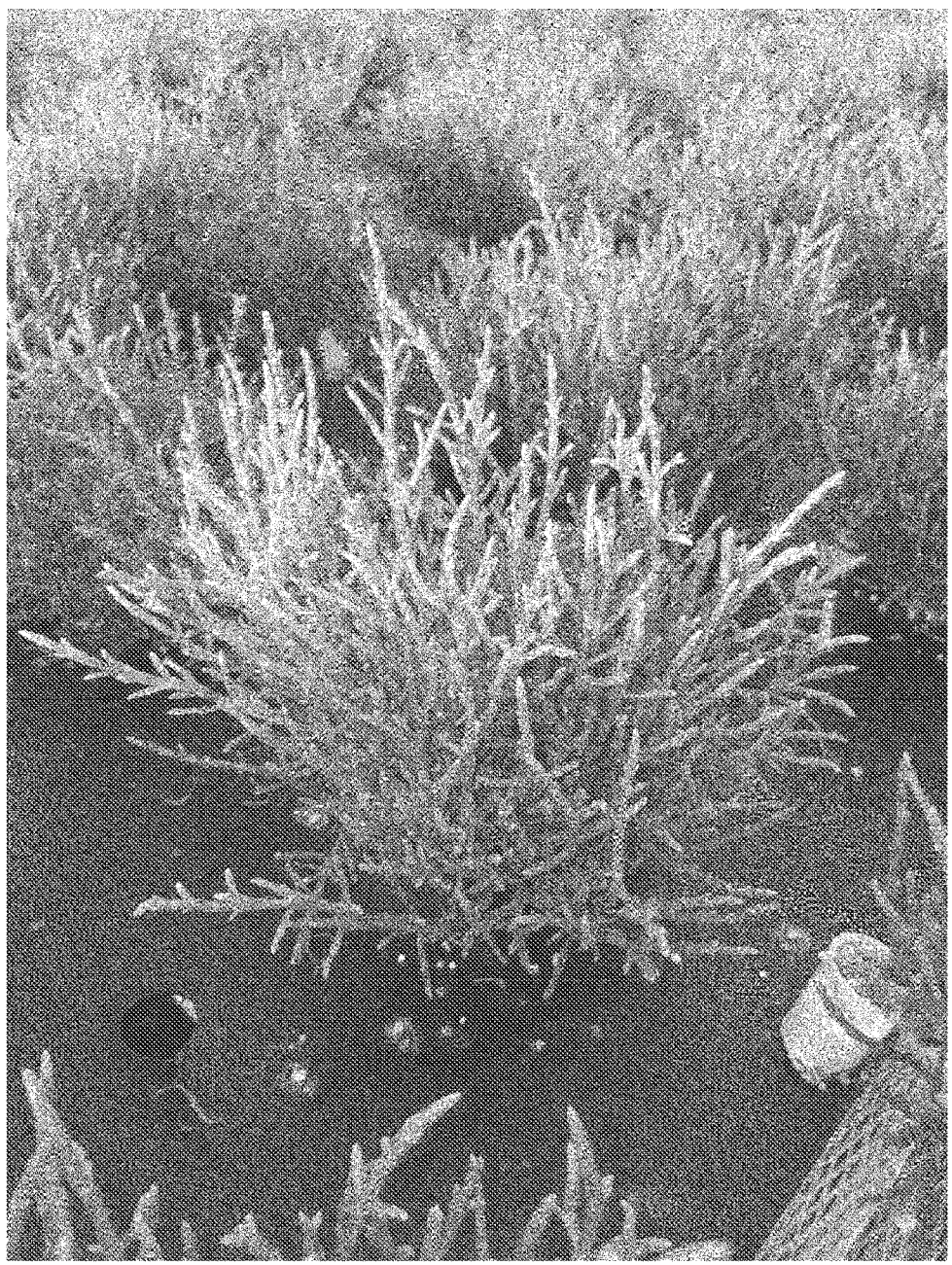
FIG. 11A shows a sea asparagus (*Salicornia bigelovii* Torr.) plant after irrigation with saltwater.
Figure 11B:
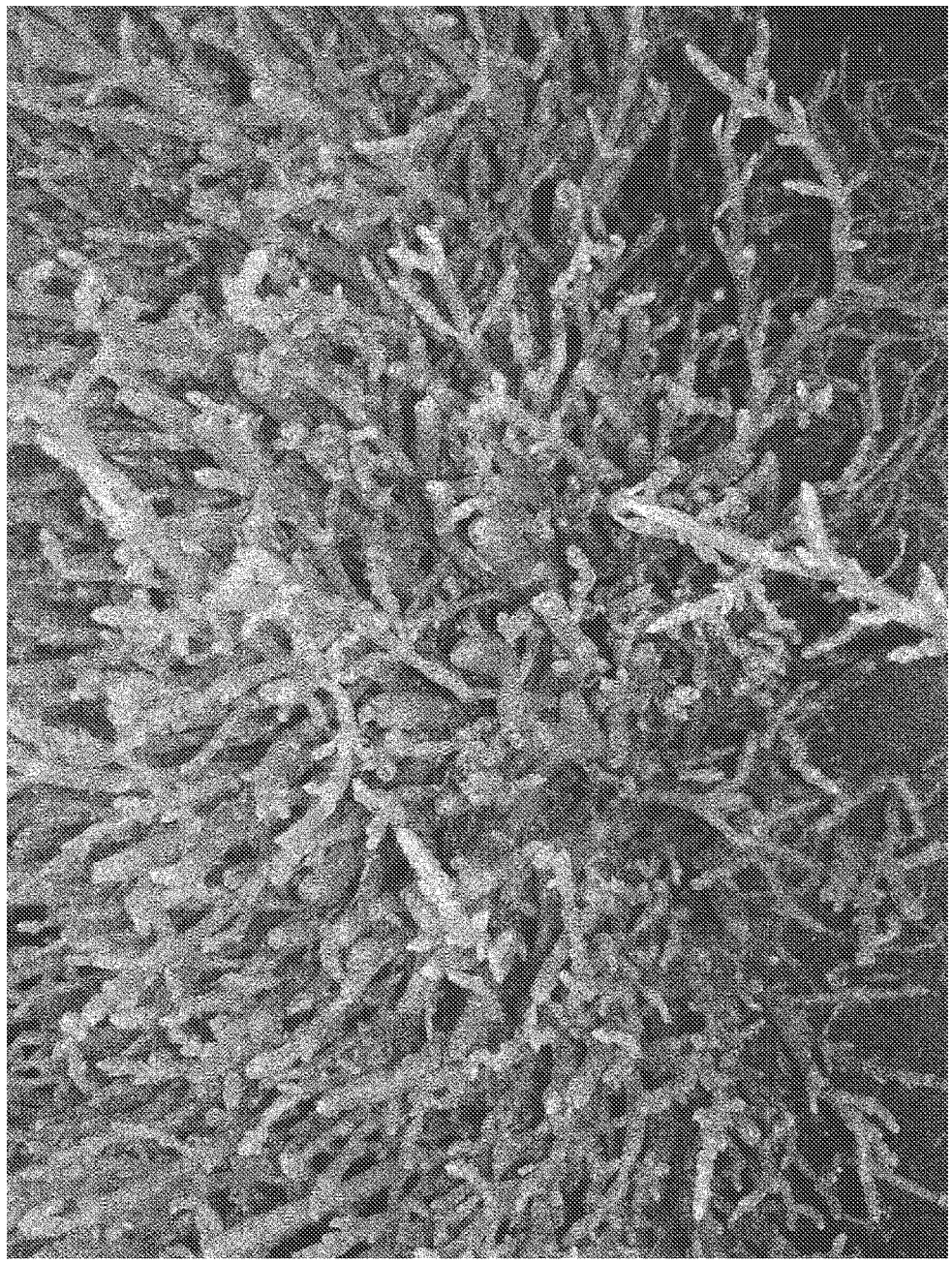
FIG. 11B shows a sea asparagus plant (*Salicornia bigelovii* Torr.) that did not receive saltwater irrigation.
Figure 11C:
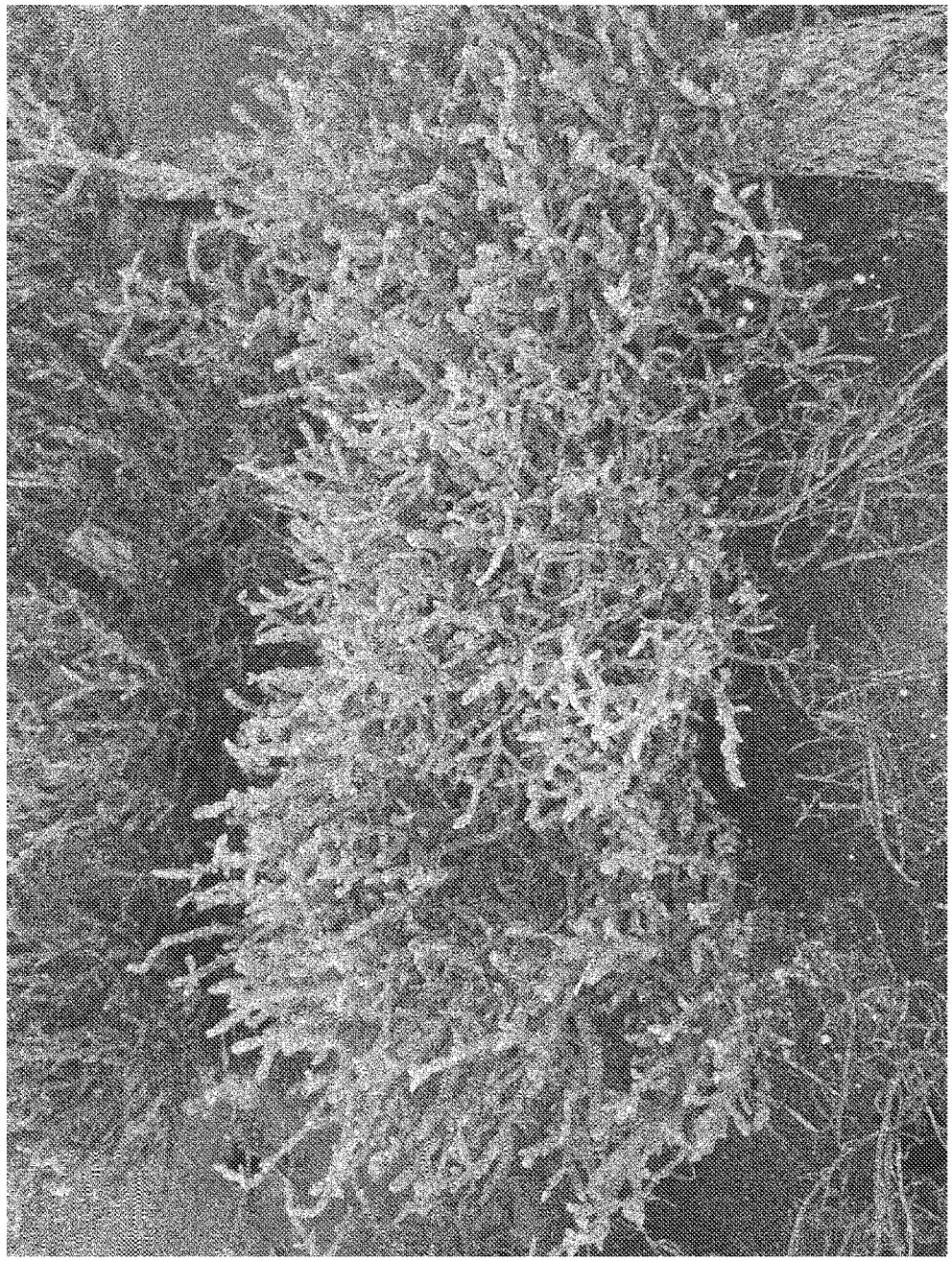
FIG. 11C shows a sea asparagus plant (*Salicornia bigelovii* Torr.) that did not receive saltwater irrigation and is unharvestable.

The experiment includes two groups: one experimental group receiving saltwater irrigation (FIG. 11A) and one control group without saltwater irrigation (FIG. 11B). Sea asparagus seedlings were cultivated in a greenhouse for about two months. Approximately eight hundred plant cells were transplanted to a buoyant platform (4'×100') and hydroponically cultivated in a saltwater pond. Five blank rows of platforms were established between three treatment platforms and three control platforms to prevent interference or cross-contamination between the groups. Each treatment (i.e., saltwater irrigation or no saltwater irrigation) was repeated three times. The experimental group, as shown in FIG. 11A, was irrigated with saltwater with salinity of approximately thirty-one parts per thousand for thirty minutes once a week when it was dry (i.e., not raining) and two to three times a day when it was raining. Plants were harvested starting one month after transplantation and continuously harvested another four times. The weight of harvested sea asparagus shoots was recorded. The total non-harvestable plants, as shown in FIG. 11C, and total dead plants were counted at the end of experiment.

As shown in FIG. 11A, sea asparagus that was irrigated with saltwater before, during, and/or after rain, had little to no caterpillar damage and a healthy, green (i.e., high chlorophyll content) appearance. In contrast, as shown in FIGS. 11B and 11C, sea asparagus that did not experience saltwater irrigation had increased brown spots, significant damage to the shoot, and, in some cases, was not harvestable.

As shown in Table 1, irrigating sea asparagus with saltwater reduced damage to the sea asparagus as a result of caterpillars (e.g., compare average for control of 17% to average for saltwater irrigation of 2%). As shown in Table 2, more sea asparagus was harvested from the experimental group that was irrigated with saltwater (e.g., compare average for control of 109.7 grams to average for saltwater irrigation of 163 grams) than the control group that was not irrigated, indicating that saltwater irrigation has the potential to be used as a natural pesticide for the control of caterpillars and other insects in salt-tolerant plants.

TABLE 1

Effect of Saltwater Irrigation on Damage to Sea Asparagus by Caterpillars

| Platforms | | Percent of Plant Damaged (%) | | | | |
|---|---|---|---|---|---|---|
| | (Replications) | 1 | 2 | 3 | Total | Average |
| Treatment | Control | 19% | 10% | 22% | 52% | 17% |
| | Saltwater Irrigation | 1% | 2% | 2% | 6% | 2% |

TABLE 2

Effect of Saltwater Irrigation on Production of Sea Asparagus

| Platforms | | Productivity, total harvest weight (gram) per plant | | | | |
|---|---|---|---|---|---|---|
| | (Replications) | 1 | 2 | 3 | Total | Average |
| Treatment | Control | 115.4 | 106.1 | 107.7 | 392.2 | 109.7 |
| | Saltwater Irrigation | 180.5 | 182.4 | 126.2 | 489.1 | 163.0 |

What is claimed is:

1. A computer-implemented method of irrigating a saline aquaculture system to control pests in the saline aquaculture system, the method comprising:
acquiring a second set of environmental condition data on a computing device using a sensor coupled to a platform,
wherein the platform defines an aperture configured to receive a plant-receiving receptacle therein, and wherein the second set of environmental condition data comprises one or more of: sunlight data, humidity data, precipitation data, and water salinity content data;
comparing, using the computing device, the second set of environmental condition data to a first set of environmental condition data acquired at a previous time point;
determining whether freshwater accumulation has increased or will increase at a future time point on a surface of the platform;
when it is determined that the freshwater accumulation on the surface of the platform has increased or will increase relative to the previous time point, activating a saltwater distribution device coupled to the platform, wherein the saltwater distribution device is configured to provide saltwater to a salt-tolerant plant growing in the plant-receiving receptacle on the surface of the platform; and
reducing an accumulation of one or more of: insects, caterpillars, fungi, and bacteria on the surface of the platform.

2. The method of claim 1, wherein the second set of environmental condition data comprises pest data indicating a presence of one or more of: insects, caterpillars, fungi, and bacteria on the surface of the platform.

3. The method of claim 1, further comprising transmitting the environmental condition data to a computing device communicatively coupled to the system.

4. The method of claim 1, wherein activating the saltwater distribution device comprises receiving a user input to activate the saltwater distribution device.

5. The method of claim 1, wherein activating the saltwater distribution device comprises automatically activating the saltwater distribution device.

6. The method of claim 1, further comprising:
comparing weather forecast data with the second set of environmental condition data; and
calculating a probability that the platform will experience an increase in fresh water accumulation.

7. The method of claim 1, wherein comparing comprises comparing a first set of precipitation data measured in the first set of environmental condition data to a second set of precipitation data measured in the second set of environmental condition data.

8. The method of claim 1, further comprising analyzing the sunlight data, precipitation data, and water salinity data in the second set of environmental condition data together to determine an amount and salt content of water on the surface of the platform.

9. The method of claim 1, further comprising analyzing the humidity data and sunlight data from the second set of environmental condition data together to determine if there is an increased probability of rain at the future time point.

10. The method of claim 1, wherein acquiring comprises measuring an amount of precipitation on or around the platform.

11. A saline aquaculture system comprising:
a platform defining an aperture configured to receive a plant-receiving receptacle for growing a salt-tolerant plant therein;
a sensor coupled to the platform;
a saltwater distribution device coupled to a top surface of the platform; and
a computing device communicatively coupled to the platform and comprising
a processor, and
a computer readable medium having non-transitory, processor-executable instructions stored thereon, wherein execution of the instructions causes the processor to perform a method comprising:
acquiring a second set of environmental condition data using the sensor coupled to the platform, wherein the second set of environmental condition data comprises one or more of: sunlight data, humidity data, precipitation data, and water salinity content data;
comparing, using the computing device, the second set of environmental condition data to a first set of environmental condition data acquired at a previous time point;
determining whether freshwater accumulation has increased or will increase at a future time point on a surface of the platform;
when it is determined that the freshwater accumulation on the surface of the platform has increased or will increase relative to the previous time point, activating the saltwater distribution device, wherein the saltwater distribution device is configured to provide saltwater to the salt-tolerant plant growing in the plant-receiving receptacle on the surface of the platform; and
reducing an accumulation of one or more of: insects, caterpillars, fungi, and bacteria on the surface of the platform.

12. The system of claim 11, wherein the platform comprises a membrane supported by two or more buoyant elongate members.

13. The system of claim 11, further comprising a penetrable barrier coupled to the platform.

14. The system of claim 11, wherein the salt-tolerant plant is a *Salicornia* spp.

15. The system of claim 11, wherein the one or more sensors include one or more of: a salinity sensor, a temperature sensor, a relative humidity sensor, a Dew point sensor, a barometer, a photometer, a rain gauge, and a camera.

16. The system of claim 11, wherein the environmental condition includes one or more of: a temperature, a moisture level, a salinity content, a humidity level, an amount of precipitation, a sunlight intensity, bacterial growth, fungal growth, and an insect presence.

17. The system of claim 11, further comprising an antenna coupled to the platform, the antenna being configured to transmit the environmental condition data to the computing device.

18. The system of claim 11, wherein the computing device is configured to display the first and second sets of environmental condition data.

19. The system of claim 11, further comprising a water-dwelling animal and a second salt-tolerant plant, wherein the water-dwelling animal and the second salt-tolerant plant reside in a liquid surrounding the platform.

20. The system of claim 19, further comprising an aeration device configured to provide oxygen and agitation in the liquid to induce nutrient distribution in the liquid.

* * * * *